United States Patent [19]

Yokoya et al.

[11] Patent Number: 4,985,323

[45] Date of Patent: Jan. 15, 1991

[54] ELECTROPHOTOGRAPHIC PRINTING PLATE

[75] Inventors: Hiroaki Yokoya; Hiromichi Tachikawa; Hideo Sato, all of Kanagawa, Japan

[73] Assignee: Fuji Photo Film Co., Ltd., Kanagawa, Japan

[21] Appl. No.: 250,669

[22] Filed: Sep. 29, 1988

[30] Foreign Application Priority Data

| Sep. 29, 1987 | [JP] | Japan | 62-244880 |
|---|---|---|---|
| Feb. 10, 1988 | [JP] | Japan | 63-29619 |
| Feb. 12, 1988 | [JP] | Japan | 63-30622 |
| Feb. 16, 1988 | [JP] | Japan | 63-33758 |
| Feb. 16, 1988 | [JP] | Japan | 63-33759 |
| Feb. 16, 1988 | [JP] | Japan | 63-33760 |
| Feb. 24, 1988 | [JP] | Japan | 63-41276 |
| Feb. 24, 1988 | [JP] | Japan | 63-41277 |
| Feb. 24, 1988 | [JP] | Japan | 63-41278 |
| Feb. 24, 1988 | [JP] | Japan | 63-41279 |
| Feb. 26, 1988 | [JP] | Japan | 63-43509 |
| Feb. 26, 1988 | [JP] | Japan | 63-43511 |

[51] Int. Cl.$^5$ .............................. G03G 5/09
[52] U.S. Cl. ........................... 430/49; 430/81; 430/82; 430/83
[58] Field of Search .................. 430/81, 82, 83, 49

[56] References Cited

U.S. PATENT DOCUMENTS

| Re. 28,698 | 1/1976 | Murakami et al. | 430/80 X |
|---|---|---|---|
| 3,881,924 | 4/1975 | Murakami et al. | 430/81 |
| 3,938,994 | 2/1976 | Reynolds et al. | 430/81 X |
| 4,063,948 | 12/1977 | Lind | 430/81 |
| 4,315,983 | 2/1982 | Kawamura et al. | 430/70 |
| 4,389,474 | 6/1983 | Kawamura et al. | 430/81 X |
| 4,444,863 | 4/1984 | Sano et al. | 430/83 |
| 4,447,515 | 5/1984 | Kondo et al. | 430/83 |
| 4,477,547 | 10/1984 | Yamada et al. | 430/49 |
| 4,499,167 | 2/1985 | Sano et al. | 430/83 |
| 4,500,617 | 2/1985 | Nakayama | 430/49 |
| 4,663,260 | 5/1987 | Kitatani et al. | 430/83 |
| 4,880,716 | 11/1989 | Kato et al. | 430/49 |

FOREIGN PATENT DOCUMENTS

| 1146794 | 5/1983 | Canada . | |
|---|---|---|---|
| 52-3302 | 1/1977 | Japan | 430/82 |
| 59-44060 | 5/1984 | Japan | 430/49 |
| 59-128561 | 7/1984 | Japan | 430/49 |
| 59-152457 | 8/1984 | Japan | 430/49 |

*Primary Examiner*—Roland Martin
*Attorney, Agent, or Firm*—Sughrue, Mion, Zinn, Macpeak & Seas

[57] ABSTRACT

An electrophotographic printing plate comprising a conductive support having provided thereon a photoconductive insulating layer containing:
(1) at least one organic photoconductive compound,
(2) at least one sensitizer selected from the group consisting of compounds represented by formula (A-I), (A-II), (B), (C-I), (C-II), (C-III), (C-IV), (D) or (E);

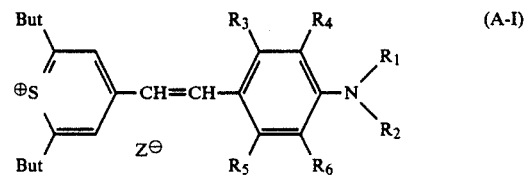

(A-I)

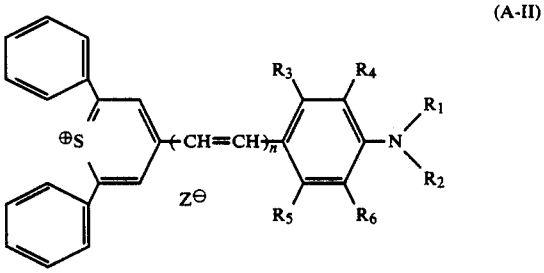

(A-II)

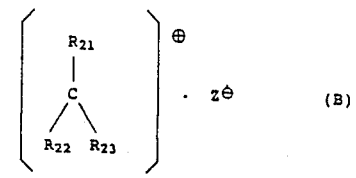

(B)

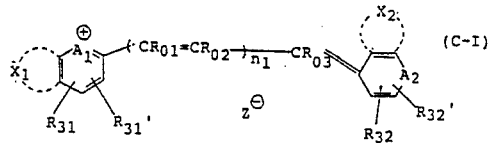

(C-I)

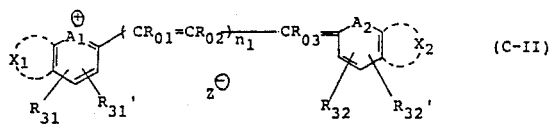

(C-II)

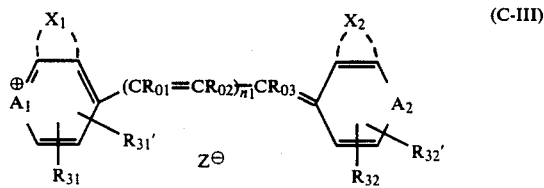

(C-III)

(Abstract continued on next page.)

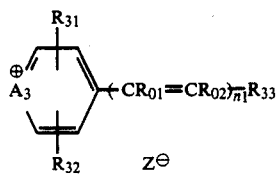 (C-IV)

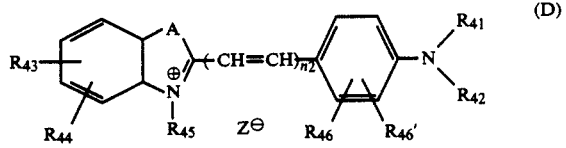 (D)

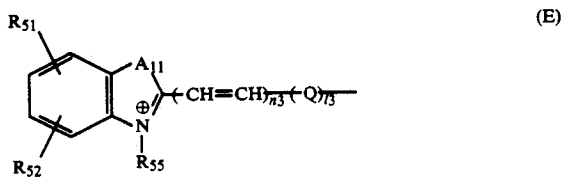 (E)

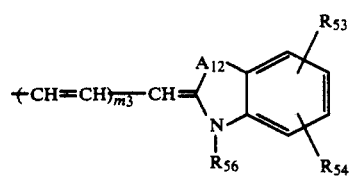

(3) at least one amide compound selected from the group consisting of compounds represented by formula (I), (II), or (III);

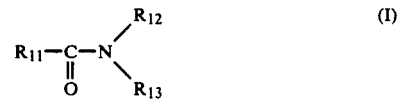 (I)

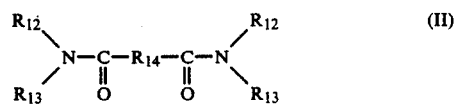 (II)

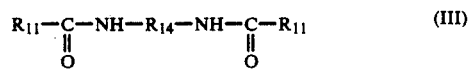 (III)

and (4) a binder resin soluble or dispersible in an alkaline solvent (wherein symbols in formulae are defined as in claim 1). The printing plate exhibits high sensitivity sufficient to respond to a laser light source and provides a printing plate free from background stains.

29 Claims, No Drawings

ELECTROPHOTOGRAPHIC PRINTING PLATE

FIELD OF THE INVENTION

This invention relates to an electrophotographic printing plate mainly comprising an organic photoconductive substance and an alkali-soluble or dispersible binder.

BACKGROUND OF THE INVENTION

Lithographic offset printing plate on the market include presensitized plates (hereinafter referred to as PS plates) using a positively working sensitive agent mainly comprising a diazo compound and a phenolic resin or a negatively working sensitive agent mainly comprising an acrylic monomer or prepolymer. Since all of these printing plate exhibit low sensitivity, plate making is performed by exposing the precursor to light through an intimately contacted silver salt photographic film having previously formed thereon an original image. On the other hand, with the development of image processing by computers, storage of vast data, and data telecommunication techniques, an electronic compilation system has been put into practical use, in which processing including data input, correction, composing, assignment, and page composing are consistently operated by a computer and the data can be instantaneously output from a terminal plotter at a remote place by means of a rapid communication network or a satellite communication network. In the field of newspaper printing requiring promptness, there is a particularly high demand for the electronic compilation system. Also in the field where an original is stored in the form of a film and a printing plate is reproduced from the film when necessary, the development of ultra-high volume recording media such as photo discs is believed to enable storage of the originals as digital data in these recording media.

However, rarely has a direct type printing plate precursor which can provide a printing plate directly from the output of the terminal plotter been put into practical use. Under the present situation, the output from an electronic compilation system is transformed once into an image on a silver salt photographic film, which is then brought into contact with a PS plate for exposure to make a printing plate. This is because of difficulty in developing a direct type printing plate having a sufficiently high sensitivity to produce a printing plate within a practical amount of time by means of the light source used in the output plotter, e.g., an He-Ne laser, a semi-conductor laser, etc.

Electrophotographic photoreceptors are candidates for a photoreceptor having such a high photosensitivity that may provide a direct type printing plate. Known printing plate precursors utilizing electrophotography include offset printing plate materials comprising a zinc oxide-resin dispersion system as disclosed in JP-B-47-47610, 48-40002, 48-18325, 51-15766, and 51-25761 (the term "JP-B" as used herein means an "examined published Japanese patent application"). A printing plate of this type is subjected to electrophotographic processing to form a toner image and then treated with an oil-desensitizing solution (e.g., an acidic aqueous solution containing a ferrocyanide or a ferricyanide) to make the nonimage area oil-insensitive in order to produce an offset printing plate. The printing plate thus obtained has a printing durability of from about 5000 to 10,000 prints and does not withstand further printing. Besides, a photoreceptor having a composition suitable for oil-desensitization would exhibit deteriorated electrostatic characteristics and deteriorated image quality. There is a further disadvantage in that a harmful cyan compound is employed in the oil-desensitizing solution.

JP-B 37-17162, 38-7758, 46-39405, and 52-2437 disclose a printing plate material comprising an organic photoconductive substance-resin system, in which a photo conductive insulating layer comprising an oxazole or an oxazole compound dispersed in a styrene-maleic anhydride copolymer is provided on a grained aluminum plate to construct an electrophotographic photoreceptor, which is electrophotographically processed to form a toner image and then treated with an alkaline organic solvent to dissolve out the non-image area to produce a printing plate.

The inventors previously proposed an electrophotographic light-sensitive printing plate material containing a hydrazone compound and barbituric acid or thiobarbituric acid as disclosed in JP-A-147656 (corresponding to U.S. Pat. No. 4,500,622; the term "JP-A" as used herein means an "unexamined published Japanese patent application"). Further, JP-A-59-147335, 59-152456, 59-168462, and 58-145495 disclose electrophotographic printing plate sensitized with dyes. However, all of these proposals turned out to fail to attain sufficient sensitivity to an oscillation wavelength region of an He-Ne laser or a semi-conductor laser that is of low cost and also contributes to reduction of the size of the apparatus.

There are also known non-uniform electrophotographic printing plates in which organic pigment particles are dispersed in a binder as an electron generating agent. For example, JP-A-55-161250, 56-146145, and 60-17751 disclose those in which a phthalocyanine pigment, an azo pigment or a condensed polycyclic quinone pigment, etc. is dispersed in a binder as an electronic charge generating agent. These non-uniform electrophotographic printing plates generally exhibit higher sensitivity as compared with uniform ones, but not even a few of them exhibit sufficient sensitivity for recording with an He-Ne laser. In some cases, however, they suffer from insufficiency in etching of the non-image area with an alkaline etching solution after toner image formation particularly when in using a grained and anodically oxidized aluminum plate. This is because the pigment particles dispersed in the binder are liable to adhere to the surface of the aluminum plate and remain there after etching. The lipophilic organic pigment remaining on the hydrophilic non-image area which is exposed by etching and is meant to exhibit ink-repellency naturally cause background stains on printing. The background stain is apt to be formed particularly when printing is carried out using a low-tack ink or under a high temperature condition or a condition using a reduced amount of dampening water.

Further, since the production of the pigment-dispersed non-uniform printing plate involves a step of pigment dispersion, the resulting photoreceptors show a wide scatter in performance, making it difficult to stably obtain electrophotographic printing plate having equal performance properties for the reasons set forth below. The electrophotographic characteristics of the photoreceptor are subject to variation due to non-uniformity in particle size and particle size distribution of the pigment. The viscosity of a pigment dispersion undergoes a drastic change in a short time after preparation, resulting in a large variation in the coating thickness. Therefore, the stability of the coating is so poor that difficulty arises in control of the thickness of the photosensitive layer, and electrophotographic characteristics such as charging properties are not constant.

As discussed above, the pigment-dispersed system non-uniform electrophotographic printing plates, though high in sensitivity, are liable to cause background stains, exhibit poor quality stability, and encounter difficulty in performing stable production, thus requiring a special device for production. Accordingly, a great demand exists to develop a uniform electrophotographic printing plate exhibiting high sensitivity without using a pigment.

When an electrophotographic photoreceptor is used as a printing plate, an alkali-soluble resin binder is usually used in order that the non-image area may be etched to expose the hydrophilic area. The alkali-soluble resins are generally inferior in compatibility with organic photoconductive compounds as compared with polycarbonate resins which are widely employed as binders for electrophotographic printing plates. Therefore, the amount of the organic photoconductive compound to be incorporated into an electrophotographic light-sensitive layer should be limited. The organic photoconductive compound, if incorporated in an amount exceeding a certain limit, would be precipitated from the light-sensitive layer to deteriorate electrophotographic performance properties. On the other hand, reduction of the amount of the organic photoconductive compound in the light-sensitive layer results in reduction of electrophotosensitivity. Hence, it has been difficult to increase electrophotosensitivity of the uniform electrophotographic printing plates sensitized with sensitizing dyes.

SUMMARY OF THE INVENTION

One object of this invention is to provide an electrophotographic printing plate exhibiting high sensitivity to a laser light source.

Another object of this invention is to provide an electrophotographic printing plate which exhibits satisfactory sensitivity and provides a printing plate free from background stains on the non-image area.

A further object of this invention is to provide an electrophotographic printing plate which shows satisfactorily stable quality and can be produced with high stability.

A still further object of this invention is to provide an electrophotographic printing plate having satisfactory preservability, retaining excellent electrostatic characteristics.

As a result of extensive investigations, it has now been found that the above objects of this invention can be accomplished by an electrophotographic printing plate comprising a conductive support having provided thereon a photoconductive insulating layer containing (1) at least one organic photoconductive compound, (2) at least one sensitizer selected from the group consisting of compounds represented by formula (A-I), (A-II), (B), (C-I), (C-II), (C-III), (C-IV), (D) or (E);

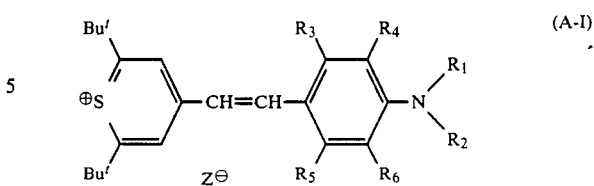

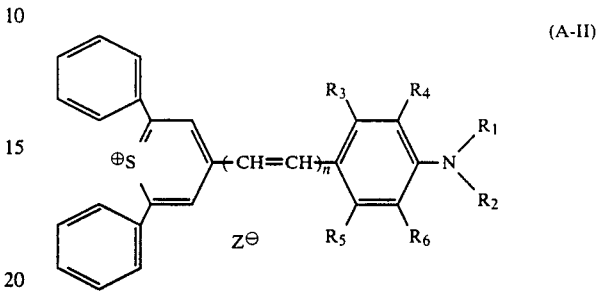

wherein $Bu^t$ represents a t-butyl group; $R_1$ and $R_2$, which may be the same or different, each represents a hydrogen atom, a substituted or unsubstituted alkyl group having from 1 to 5 carbon atoms, or a substituted or unsubstituted aryl group having from 6 to 18 carbon atoms; $R_3$, $R_4$, $R_5$, and $R_6$, which may be the same or different, each represents a hydrogen atom, an alkyl group having from 1 to 5 carbon atoms, an alkoxy group having from 1 to 5 carbon atoms, or a halogen atom; $Z^\ominus$ represents an anion; and n represents 0 or 1;

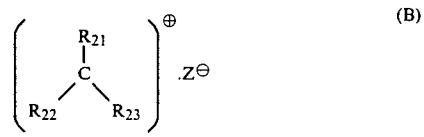

wherein $R_{21}$ represents a hydrogen atom or a substituted or unsubstituted aryl group which may be condensed with a substituted or unsubstituted heterocyclic ring; $R_{22}$ and $R_{23}$, each represents a substituted or unsubstituted aryl group which may be condensed with a substituted or unsubstituted heterocyclic ring; and $Z^\ominus$ represents an anion;

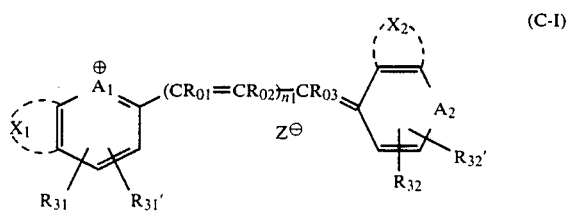

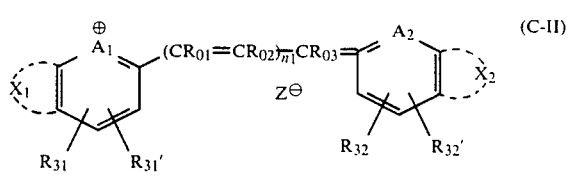

-continued

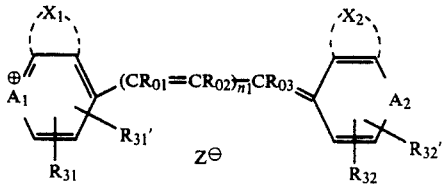
(C-III)

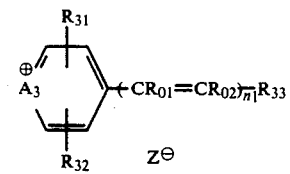
(C-IV)

wherein $A_1$ and $A_2$, which may be the same or different, each represents —O—, —S— or —Se—; $A_3$ represents —Se— or O; $R_{31}$, $R_{31}'$, $R_{32}$ and $R_{32}'$ which may be the same or different, each represents a hydrogen atom, a substituted or unsubstituted alkyl group, a substituted or unsubstituted alkenyl group, a substituted or unsubstituted aralkyl group, or a substituted or unsubstituted aryl group; $R_{33}$ represents a substituted or unsubstituted aryl group; $X_1$ and $X_2$ each represents nothing or a ring selected from the group consisting of a benzene ring, a naphthalene ring, an anthracene ring, and a phenanthrene ring which is condensed to the pyran, thiopyran or selenapyran ring; $R_{01}$, $R_{02}$ and $R_{03}$, which may be the same or different, each represents a hydrogen atom or a substituted or unsubstituted alkyl group; $n_1$ represents 0, 1 or 2, provided that when both of $A_1$ and $A_2$ represent —O— and when one of them represents —O— and the other one represents —S—, $n_1$ represents 0 or 1; and $Z^\ominus$ represents an anion;

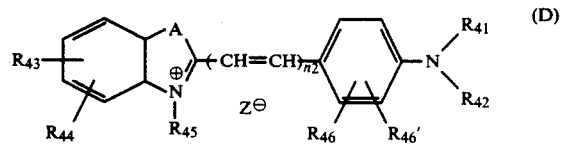
(D)

wherein A represents —O—, —S—, —Se—,

—CH=CH—, or

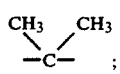

$R_{41}$ and $R_{42}$, which may be the same or different, each represents a hydrogen atom, a substituted or unsubstituted alkyl group, a substituted or unsubstituted alkenyl group, a substituted or unsubstituted aralkyl group, or a substituted or unsubstituted aryl group; $R_{45}$ and $R_{47}$, which may be the same or different, each represents a substituted or unsubstituted alkyl group, a substituted or unsubstituted alkenyl group, a substituted or unsubstituted aralkyl group, or a substituted or unsubstituted aryl group; $R_{43}$, $R_{44}$, $R_{46}$, and $R_{46}'$ which may be the same or different, each represents a hydrogen atom, a halogen atom, a nitro group, an amido group, an acyl group, a cyano group, a trifluoromethyl group, a substituted or unsubstituted alkyl group, a substituted or unsubstituted alkneyl group, a substituted or unsubstituted aralkyl group, a substituted or unsubstituted aryl group, a substituted or unsubstituted alkoxy group, a substituted or unsubstituted aryloxy group, or a substituted or unsubstituted alkoxycarbonyl group; or $R_{43}$ and $R_{44}$ are taken together to form a ring, or $R_{46}$ and $R_{46}'$ are taken together to form a ring; $n_2$ represents 1 or 2, and $Z^\ominus$ represents an anion;

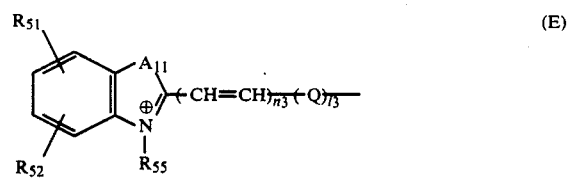
(E)

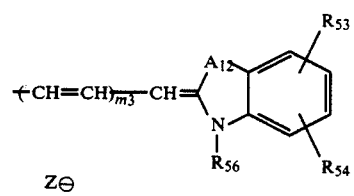

wherein $A_{11}$ and $A_{12}$, which may be the same or different, each represents —O—, —S—, —Se—, $\underset{|}{-N-}$, $\underset{|}{\overset{CH_3}{\underset{-C-}{\diagdown}}\overset{CH_3}{\diagup}}$ or —CH=CH=; $R_{51}$, $R_{52}$, $R_{53}$, and $R_{54}$, which may be the same or different, each represents a hydrogen atom, a halogen atom, a nitro group, an amido group, an acyl group, a cyano group, a trifluoromethyl group, a substituted or unsubstituted alkyl group, a substituted or unsubstituted alkenyl group, a substituted or unsubstituted aralkyl group, a substituted or unsubstituted aryl group, a substituted or unsubstituted alkoxy group, a substituted or unsubstituted aryloxy group, or a substituted or unsubstituted alkoxycarbonyl group; or $R_{51}$ and $R_{52}$ are taken together to form a ring, or $R_{53}$ and $R_{54}$ are taken together to form a ring; $R_{55}$, $R_{56}$, and $R_{57}$, which may be the same or different, each represents a substituted or unsubstituted alkyl group, a substituted or unsubstituted alkenyl group, substituted or unsubstituted aralkyl group, or a substituted or unsubstituted aryl group; Q represents a substituted or unsubstituted divalent aromatic hydrocarbon group or a substituted or unsubstituted divalent aromatic heterocyclic group; $l_3$ represents 0 or 1; $m_3$ and $n_3$ each represents 0 or 1; and $Z^\ominus$ represents an anion;

(3) at least one amide compound selected from the group consisting of compounds represented by formula (I), (II), or (III);

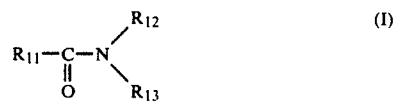
(I)

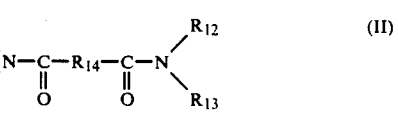
(II)

-continued

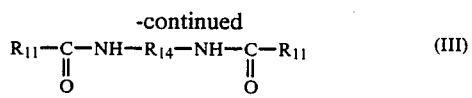

wherein $R_{11}$ represents a substituted or unsubstituted alkyl group, a substituted or unsubstituted alkoxy group, a substituted or unsubstituted monocyclic or condensed bicyclic aryl group, a substituted or unsubstituted monocyclic or condensed bicyclic aryloxy group, or a monovalent group derived from a substituted or unsubstituted heterocyclic ring, two $R_{11}$ groups may be the same or different; and $R_{12}$ and $R_{13}$, which may be the same or different, each represents a hydrogen atom, a substituted or unsubstituted alkyl group, a substituted or unsubstituted monocyclic or condensed bicyclic aryl group, or a monovalent group derived from a substituted or unsubstituted heterocyclic ring; $R_{11}$ and $R_{12}$, or $R_{12}$ and $R_{13}$ may be connected to each other to form a divalent group; and $R_{14}$ represents a methylene group, a polymethylene group, a branched alkanediyl group, or an arylene group; and (4) a binder resin soluble or dispersible in an alkaline solvent.

The compounds represented by formulae (I) to (III) function to further sensitize the dye-sensitized organic photoconductive compound. Addition of these compounds to the dye-sensitized organic photoconductive compound achieves high electrophotographic sensitivity which can never be attained by using sensitizing dyes alone, particularly favoring an electrophotographic printing plate with improved sensitivity that has hardly been achieved due to having to limit the amount of an organic photoconductive compound to be incorporated relative to an alkali-soluble or -dispersible binder resin, arising from poor compatibility therebetween.

DETAILED DESCRIPTION OF THE INVENTION

In formulae A-(I) and A-(II), the alkyl group represented by $R_1$ or $R_2$ includes methyl, ethyl, propyl, butyl, pentyl, isopropyl, isobutyl, isoamyl, sec-butyl, neopentyl, t-butyl, and t-pentyl groups. Substituents for the alkyl group include a cyano group, a halogen atom (e.g., fluorine, chlorine, and bromine atoms), a hydroxyl group, a carboxyl group, an alkoxy group containing a straight chain or branched alkyl group having from 1 to 5 carbon atoms, an aryl group having from 6 to 18 carbon atoms, an aryloxy group having from 6 to 18 carbon atoms, an alkoxycarbonyl group having from 1 to 5 carbon atoms in the alkyl moiety thereof, and an acyloxy group containing an alkylcarbonyl group having from 1 to 5 carbon atoms or a substituted or unsubstituted arylcarbonyl group having from 7 to 18 carbon atoms as the acyl moiety thereof.

Substituents for the aryl group represented by $R_1$ or $R_2$ includes a straight chain or branched alkyl group having from 1 to 5 carbon atoms, an alkoxy group containing a straight chain or branched alkyl group having from 1 to 5 carbon atoms, an alkoxycarbonyl group containing a straight chain or branched alkyl group having from 1 to 5 carbon atoms, a carboxyl group, a halogen atom (e.g., fluorine, chlorine, and bromine atoms), a mono- or di(the same or different) alkyl ($C_{1\sim 5}$) substituted or unsubstituted amino group, a nitro group, and a cyano group.

Preferred $R_1$ or $R_2$ are methyl, ethyl, propyl, fluoromethyl, chloromethyl, 2-fluoroethyl, 2-chloroethyl, cyanomethyl, 2-cyanoethyl, hydroxymethyl, 2-hydroxyethyl, methoxymethyl, 2-methoxyethyl, ethoxymethyl, 2-ethoxyethyl, carboxymethyl, 2-carboxyethyl, methoxycarbonyl methyl, 2-(methoxycarbonyl)ethyl, ethoxy-carbonylmehtyl, 2-(ethoxycarbonyl)ethyl, acetoxymethyl, benzoyloxymethyl, phenoxymethyl, 2-phenoxyethyl, phenyl, p-tolyl, m-tolyl, p-ethyphenyl, p-methoxyphenyl, p-ethoxyphenyl, p-[2-(methoxycarbonyl)ethyl]phenyl, p-[2-ethoxycarbonyl)ethyl]phenyl, p-(methoxycarbonyl-methyl)phenyl, and p-(ethoxycarbonylmethyl)phenyl groups.

Specific examples of $R_3$, $R_4$, $R_5$, or $R_6$ include a hydrogen atom, methyl, ethyl, methoxy and ethoxy groups, a fluorine atom, and a chlorine atom.

The anion as represented by $Z^\ominus$ in the above-described all formulae includes known monoatomic ions and atomic group ions having a negative charge. From the standpoint of synthesis, preferred are those of acids represented by HZ and having a pKa of 5 or less, more preferably those of strong acids having a pKa of 2 or less. Specific examples of such an anion include monoatomic ions such as halogen anions (e.g., fluoride, chloride, bromide and iodide ions); and atomic group ions, such as organic anions (e.g., trifluoroacetate, trichloroacetate, and p-toluenesulfonate ions) and inorganic anions (e.g., perchlorate, periodate, tetrachloroaluminate, trichloroferrate (II), tetrafluoroborate, hexafluorophosphate, sulfate, hydrogensulfate, and nitrate ions). For the sake of convenience, those exhibiting two valences are so interpreted that $Z^\ominus$ represents a half of the anion. Of the above-enumerated anions, preferred are chloride, bromide, perchlorate, tetrafluoroborate, p-toluenesulfonate, and trifluoro-acetate ions.

Compounds represented by formulae (A-I) and (A-II) are known to use in an electrophotographic material and it is disclosed, for example, U.S. Pat. No. 4,389,474 and J. Appl. Phys. Vol. 49, 5543, respectively.

Specific but non-limitative examples of the thiopyrylium compounds represented by formulae (A-I) or (A-II) are shown below.

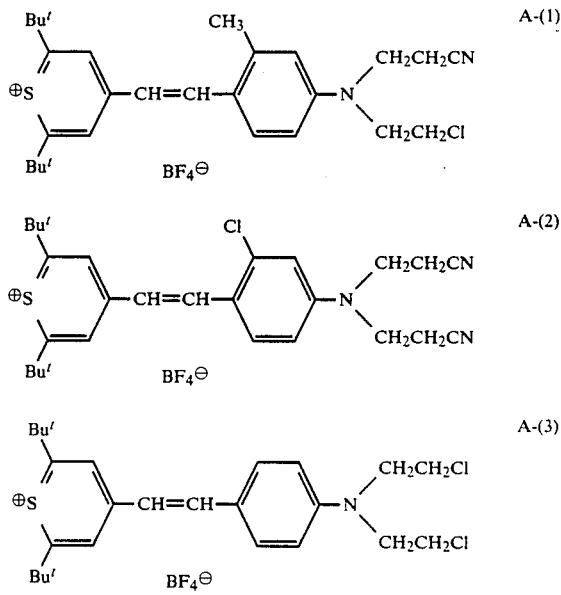

-continued
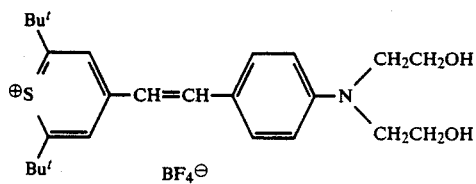
A-(4)
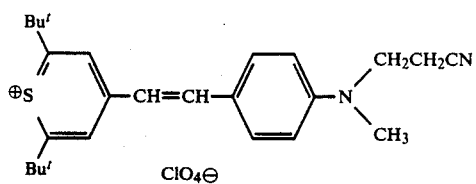
A-(5)
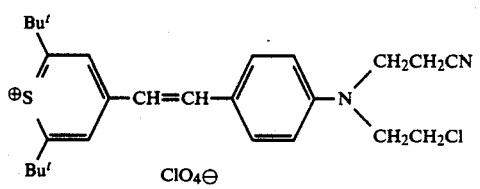
A-(6)
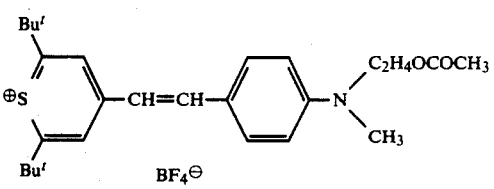
A-(7)
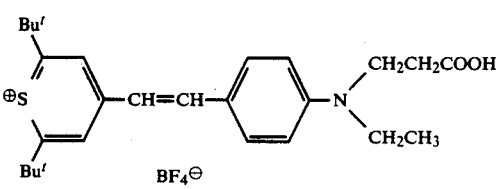
A-(8)
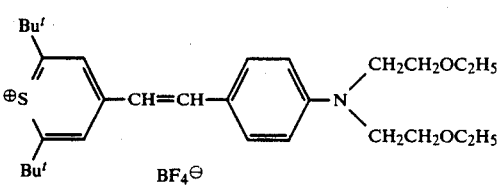
A-(9)
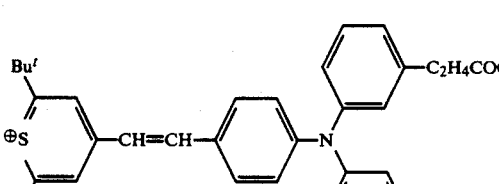
A-(10)
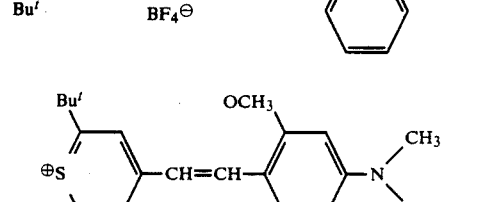
A-(11)
-continued
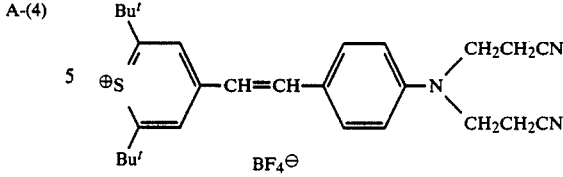
A-(12)
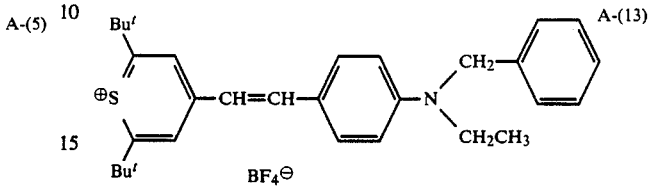
A-(13)
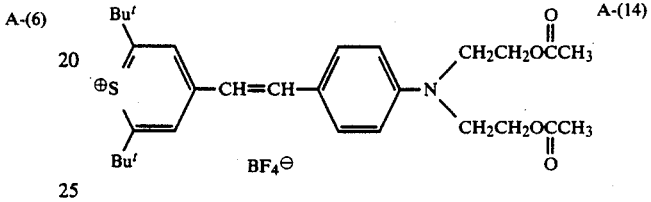
A-(14)
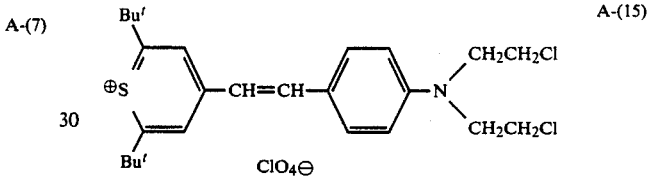
A-(15)
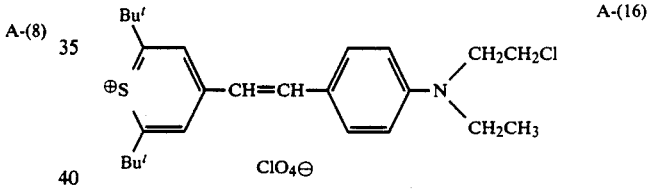
A-(16)
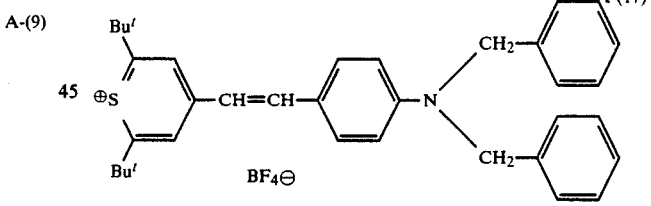
A-(17)
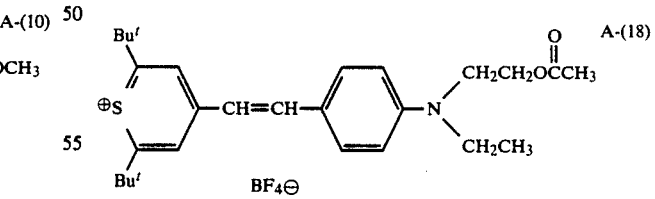
A-(18)
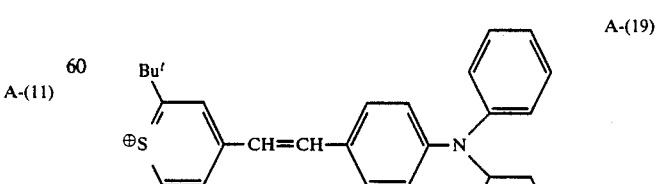
A-(19)

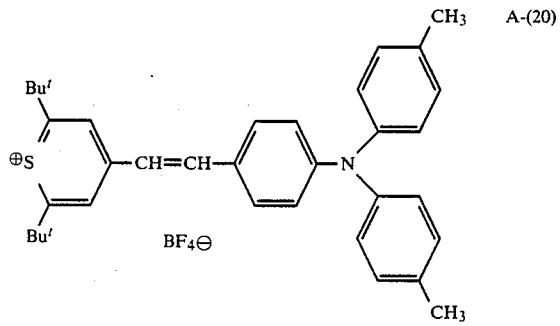
A-(20)

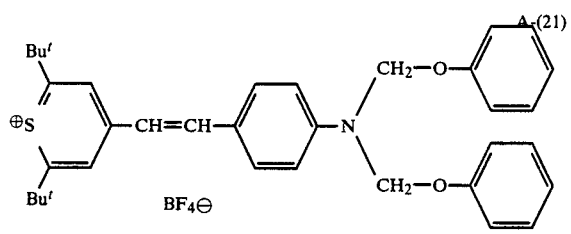
A-(21)

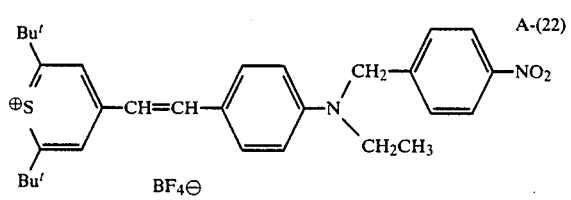
A-(22)

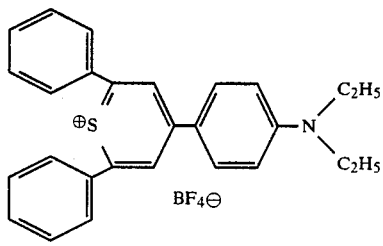
A-(23)

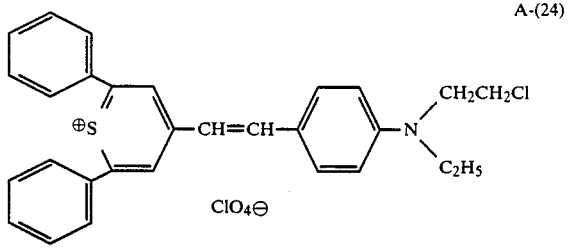
A-(24)

In formula (B), substituents for the aryl group as represented by $R_{21}$, $R_{22}$ or $R_{23}$ include a cyano group, a hydroxyl group, a carboxyl group, a nitro group, a halogen atom (e.g., chlorine and bromine), an amino group, an alkoxy group, an aryl group, an aryloxy group, an alkoxy-carbonyl group, an acyloxy group, an amino group substituted with at least one of alkyl, aryl or aralkyl group, a trifluoromethyl group, etc. The alkyl moiety in these substituents preferably has from 1 to 8 carbon atoms.

The heterocyclic ring which may be condensed to these aryl groups is preferably a 5- to 7-membered ring containing at least one of O, S and N atoms as hetero atom. Examples of such a heterocyclic ring includes a substituted or unsubstituted pyrrole ring, a substituted or unsubstituted indole ring, a substituted or unsubstituted furan ring, a substituted or unsubstituted benzofuran ring, a substituted or unsubstituted thiophene ring, a substituted or unsubstituted pyridine ring, a substituted or unsubstituted quinoline ring, a substituted or unsubstituted imidazole ring, and a substituted or unsubstituted thiazole ring. Substituents for these heterocyclic rings include a cyano group, a hydroxyl group, a carboxyl group, a nitro group, a halogen atom (e.g., chlorine and bromine), an amino group, an alkoxy group, an aryl group, an aryloxy group, an alkoxycarbonyl group, an acyloxy group, an amino group substituted with at least one of alkyl, aryl or aralkyl group, a trifluoromethyl group, etc. The alkyl moiety in these substituents preferably has from 1 to 8 carbon atoms.

The triaryl- or diarylcarbonium salt compounds represented by formula (B) can generally be prepared according to the following reaction scheme.

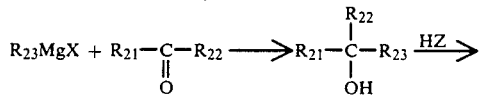
(a)     (b)     (c)

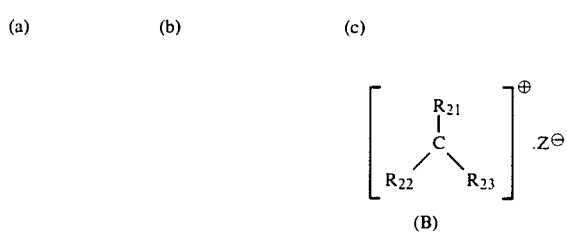
(B)

That is, an appropriate Grignard reagent (a) prepared in an ether solvent is reacted with a ketone or aldehyde (b) to obtain an alcohol (c), which is then reacted with an acid (HZ) in the presence of acetic acid or acetic anhydride to obtain a desired compound represented by formula (B).

Compounds represented by formula (B) are known to use in an electrophotographic material and it is disclosed, for example, in Y. Hayashi et al., *Bulletin of Chem. Soc. of Japan*, 1660, Vol. 39 (1966), JP-B-46-7795 and Yamanouchi et al., *Denshi Shasin* (Electrophotography) Vol. 12 (1973) and references cited therein.

Specific but non-limitative examples of the tri- or diarylcarbonyl salt compounds of formula (B) are shown below.

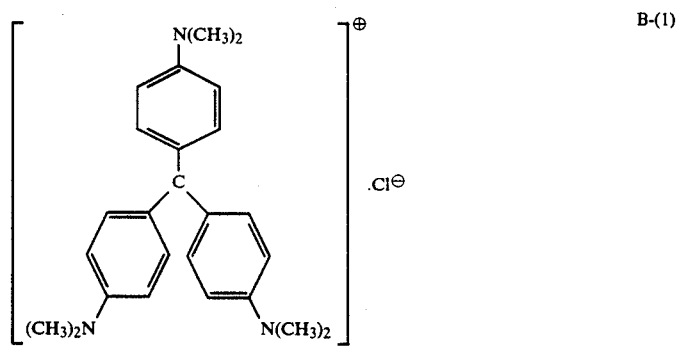 B-(1)
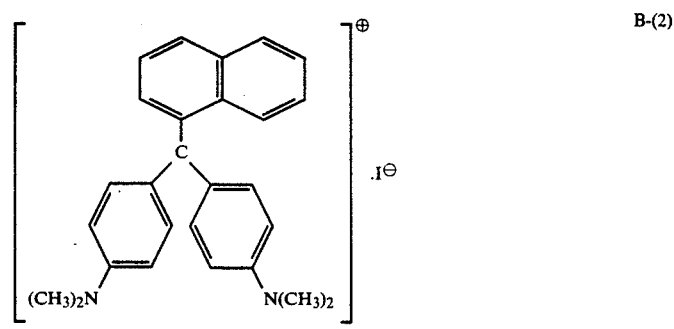 B-(2)
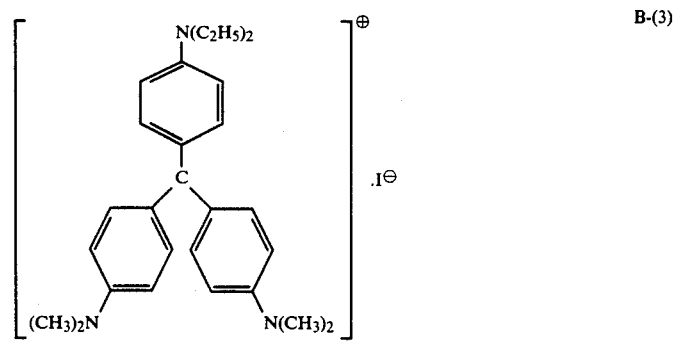 B-(3)
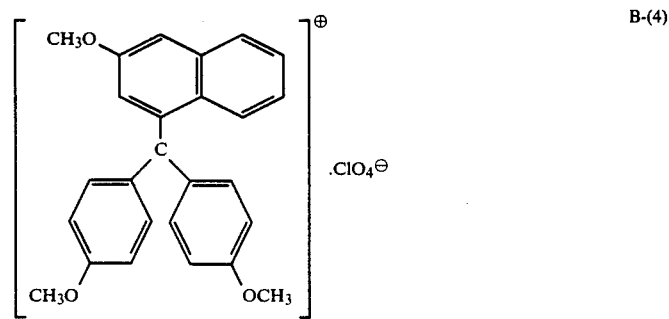 B-(4)

-continued
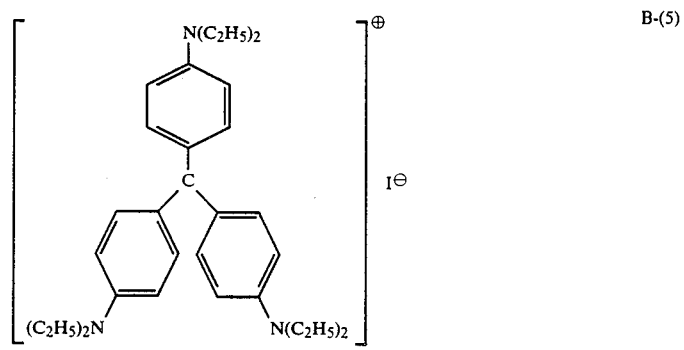
B-(5)
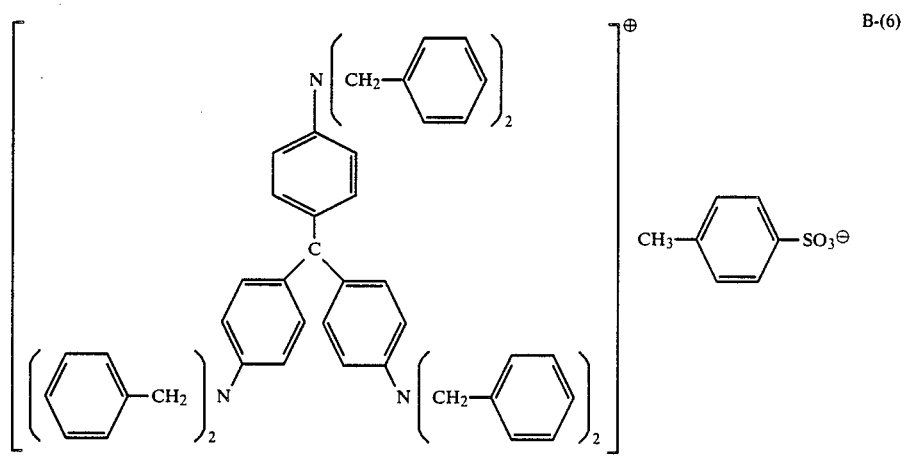
B-(6)
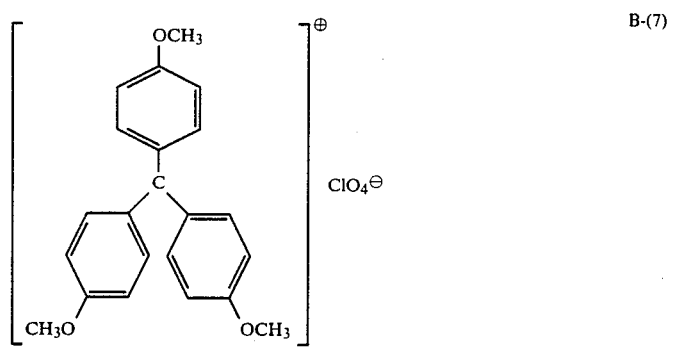
B-(7)
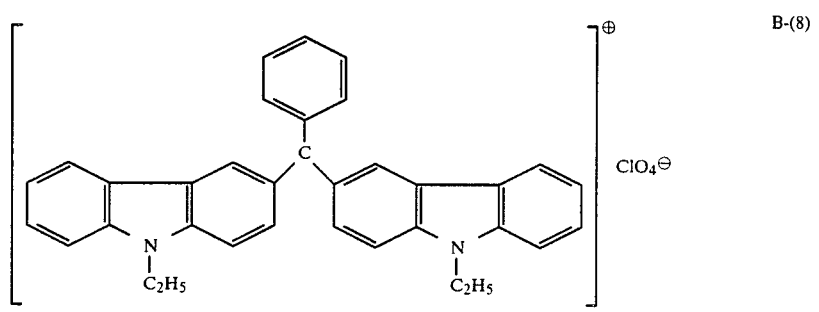
B-(8)

-continued
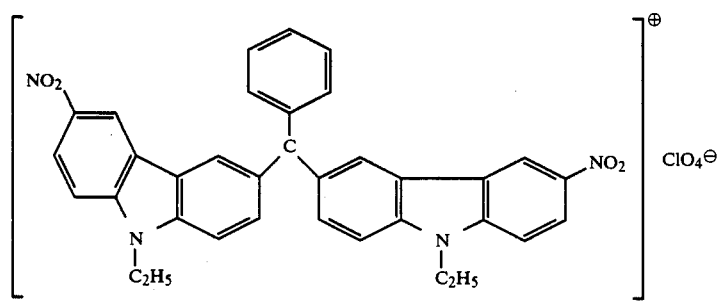
B-(9)
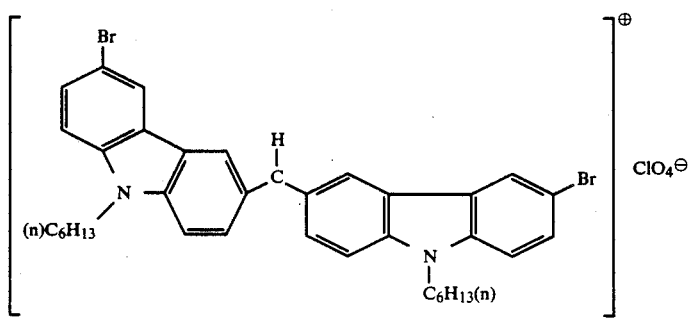
B-(10)
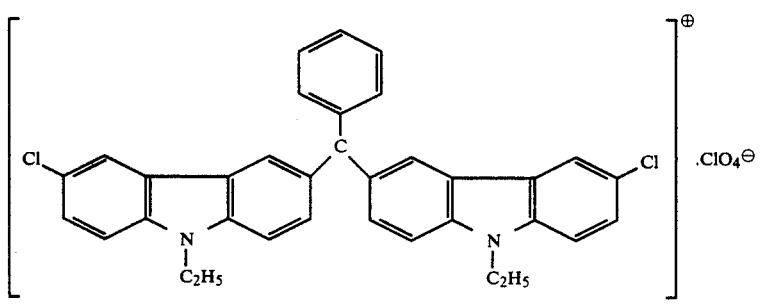
B-(11)
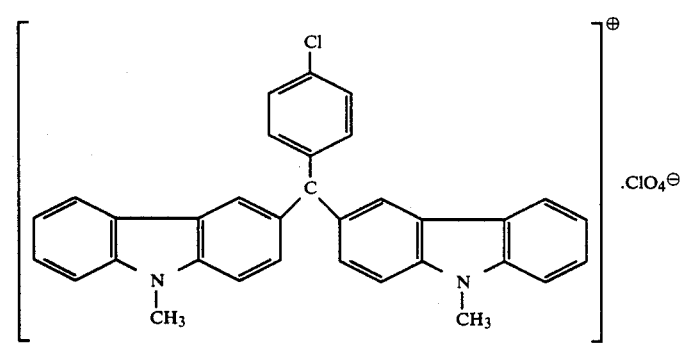
B-(12)
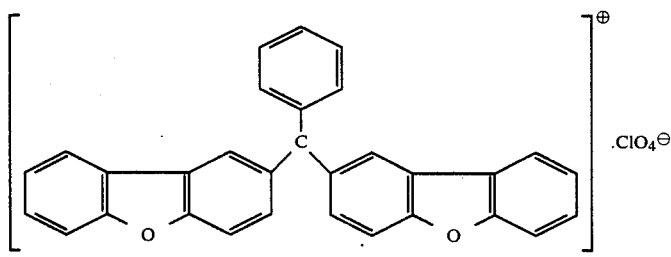
B-(13)

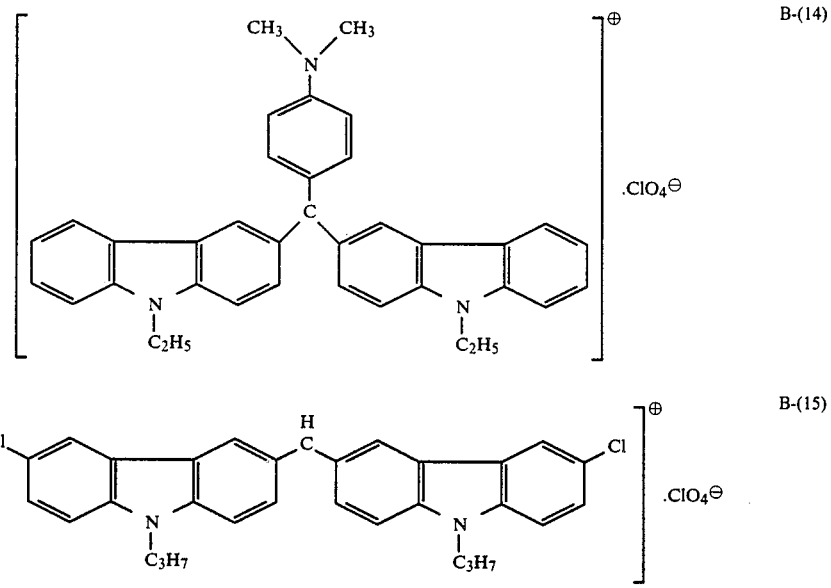

B-(14)

B-(15)

In formulae (C-1) to (C-IV), $R_{31}$, $R_{31}'$, $R_{32}$ and $R_{32}'$ each preferably has carbon atoms of from 1 to 12 in the substituted or unsubstituted alkyl, alkenyl, aralkyl and aryl groups, $R_{33}$ is an aryl group preferably having 6 to 16 carbon atoms, and $R_{01}$, $R_{02}$, and $R_{03}$ each preferably has carbon atoms of from 1 to 8.

In formulae (C-I) to (C-IV), substituents of the substituted groups as represented $R_{31}$, $R_{31}'$, $R_{32}$, $R_{32}'$, $R_{33}$, $R_{01}$, $R_{02}$, $R_{03}$, $X_1$ or $X_2$ include a cyano group, a hydroxyl group, a carboxyl group, a nitro group, a halogen atom (e.g., chlorine and bromine), an amino group, an alkoxy group, an aryl group, an aryloxy group, an alkoxycarbonyl group, an acyloxy group, an amino group substituted with at least one of alkyl, aryl or aralkyl group, a trifluoromethyl group, etc. $R_{31}$, $R_{31}'$, $R_{32}$ and $R_{32}'$ in formula (C-IV) are preferably substituted at 2- and 6-positions of the heterocyclic ring.

Specific examples of $R_{31}$, $R_{31}'$, $R_{32}$ and $R_{32}'$ are phenyl, naphthyl, styryl, methoxyphenyl, p-methylphenyl, o-methylphenyl, p-methoxystyryl, N,N-diethylaminophenyl, N,N-diethylaminostyryl, methyl, ethyl, propyl, isopropyl, butyl, octyl, isobutyl, t-butyl, 2-ethylhexyl, methoxyethyl, N,N-dimethylaminoethyl, cyanoethyl, benzyl, p-methoxybenzyl, N,N-dimethylaminobenzyl, naphthyl, and methoxynaphthyl group.

Specific examples of $R_{33}$ are phenyl, p-methoxyphenyl, o-methoxyphenyl, N,N-diethylaminophenyl, N,N-diphenylaminophenyl, N,N-dibenzylaminophenyl, N,N-dimethylaminophenyl, naphthyl, methoxynaphthyl, and N,N-diethylaminonaphthyl groups.

Specific examples for each $R_{01}$, $R_{02}$ and $R_{03}$ are a hydrogen atom and methyl, ethyl, n-propyl, isopropyl, n-butyl, sec-butyl, n-hexyl, 2-ethylhexyl, fluoromethyl, chloromethyl, trifluoromethyl, perfluoroalkyl, methoxymethyl, and cyanomethyl groups.

Specific but non-limitative examples of the oxapyrylium compounds, thiapyrylium compounds or selenapyrylium compounds represented by formulae (C-I) to (C-IV) are shown below. In the following chemical formulae, Ph represents a phenyl group; and tBu represents a t-butyl group.

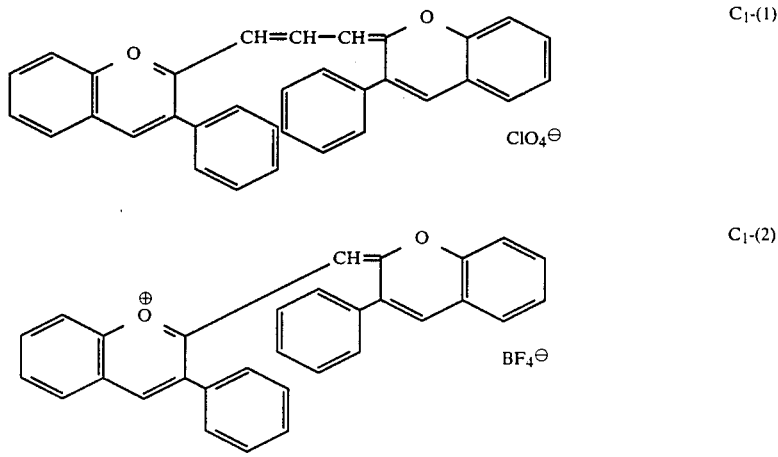

$C_1$-(1)

$C_1$-(2)

-continued
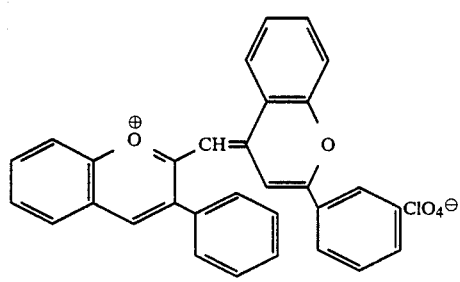
C₁-(3)
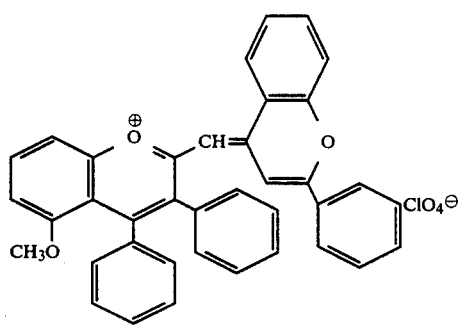
C₁-(4)
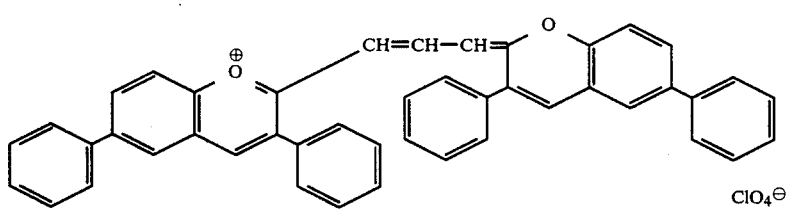
C₁-(5)
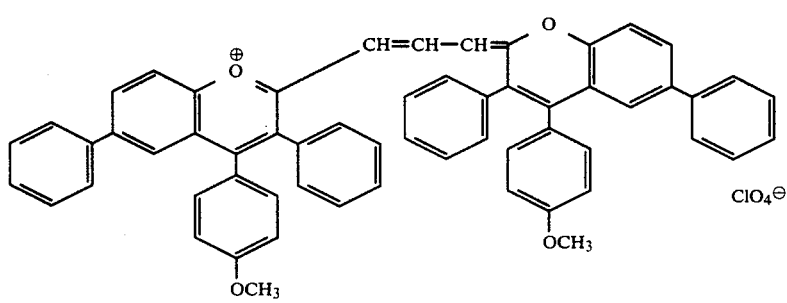
C₁-(6)
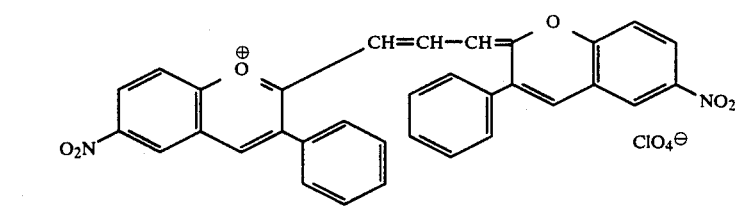
C₁-(7)
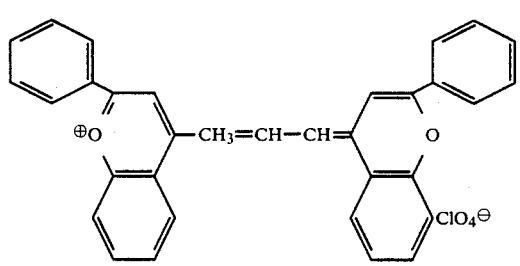
C₁-(8)

-continued
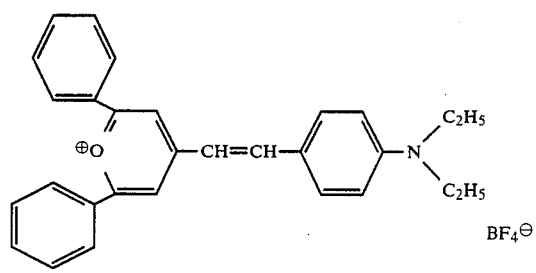
C₁-(9)
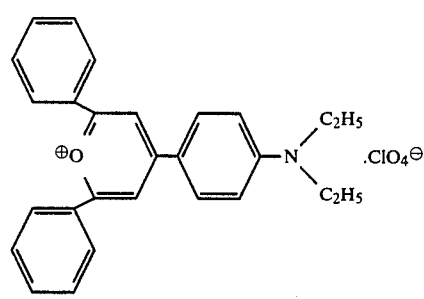
C₁-(10)
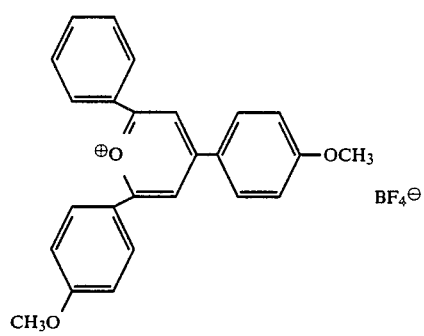
C₁-(11)
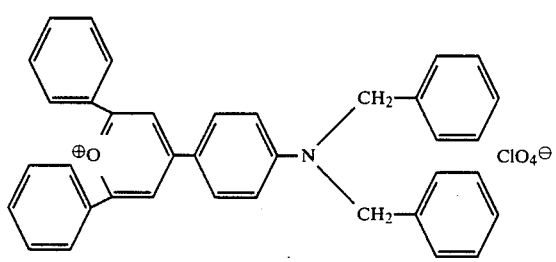
C₁-(12)
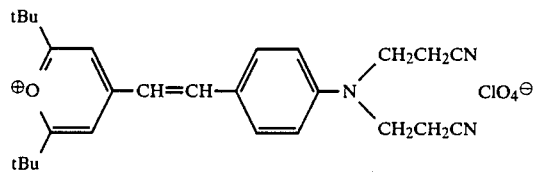
C₁-(13)
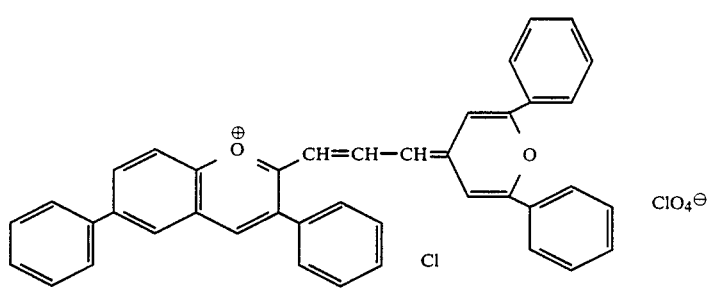
C₁-(14)

-continued
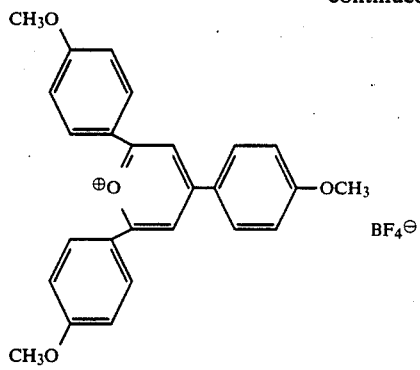
C₁-(15)
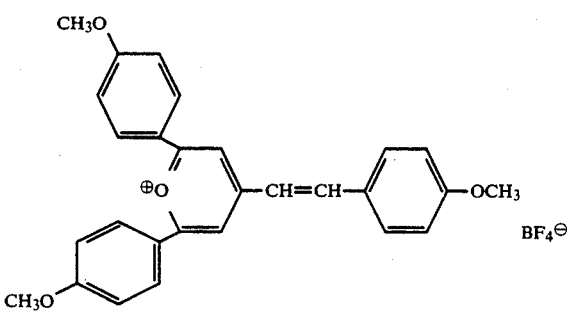
C₁-(16)
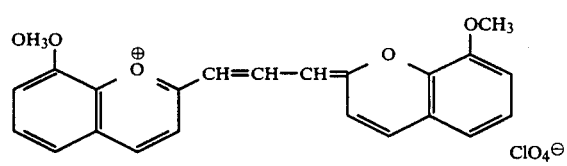
C₁-(17)
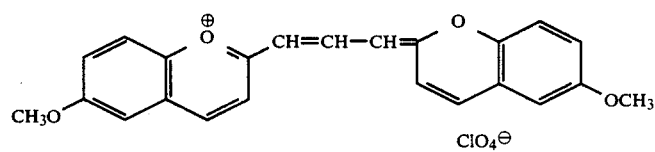
C₁-(18)
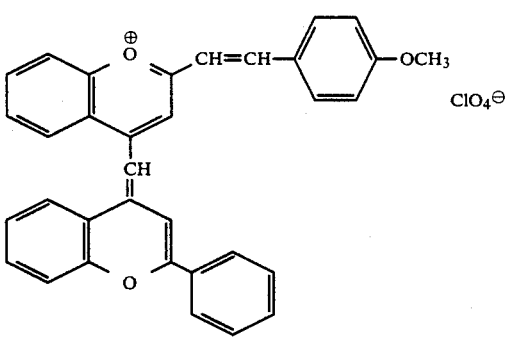
C₁-(19)
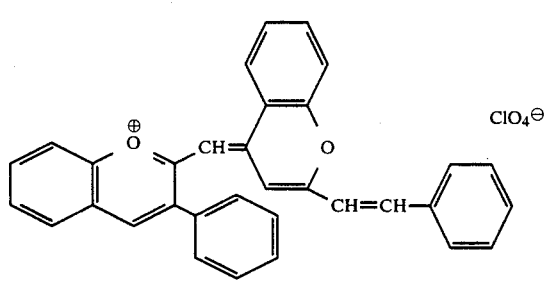
C₁-(20)

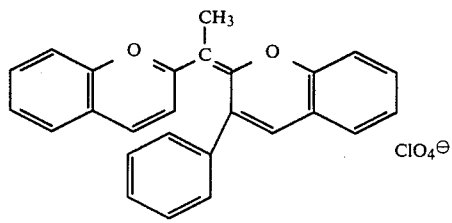

C₁-(21)

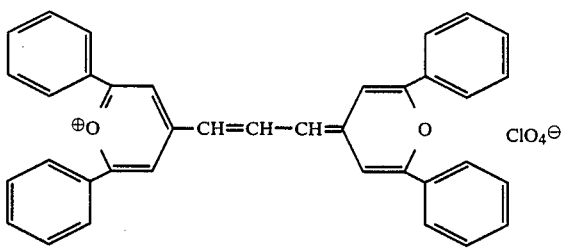

C₁-(22)

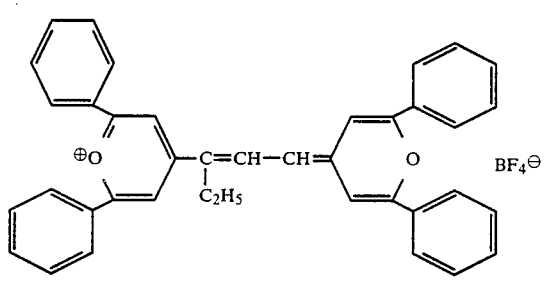

C₁-(23)

These oxapyrylium compounds are known to use in an electrophotographic material and they can be synthesized according to known processes, for example, as disclosed in JP-B-48-43151 and JP-B-48-43152, and Murakami et al., *Denshi Shashin Gakkaishi* (Journal of the Electrophotographic Society) 13, Vol. 3 (1984). For example, Compounds C₁-(3), C₁-(5) and C₁-(10) can be synthesized through the following reaction scheme:

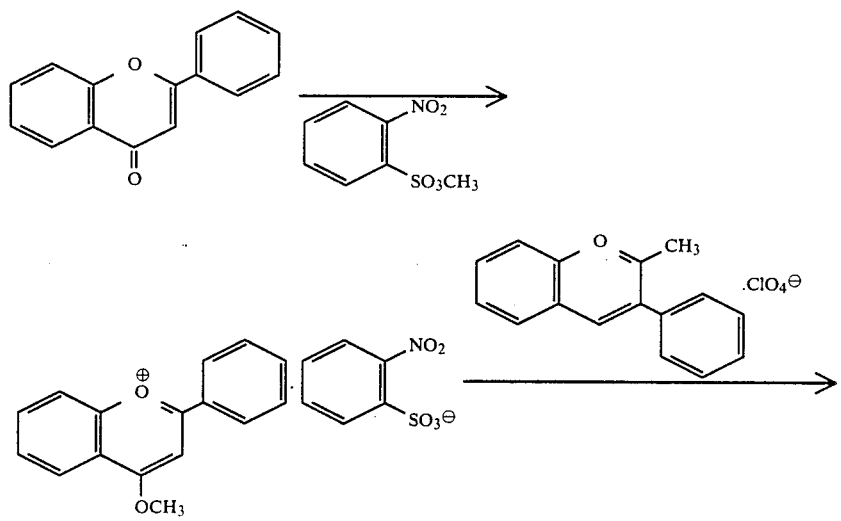

-continued
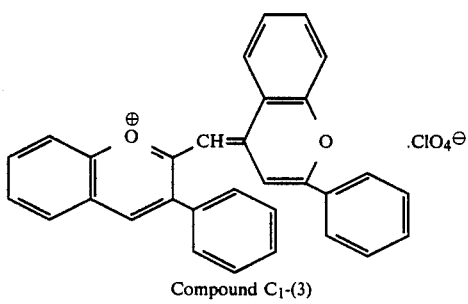
Compound C₁-(3)
Compound C₁-(5)
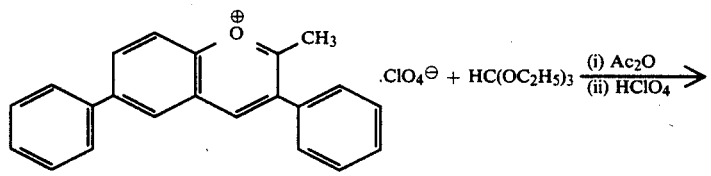
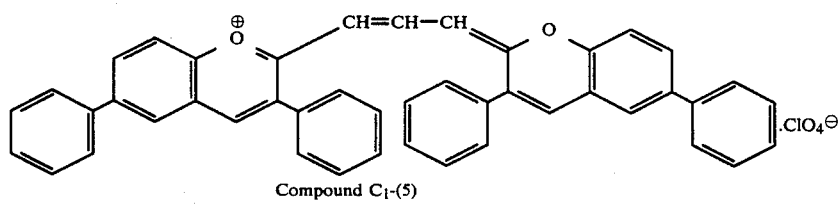
Compound C₁-(5)
Compound C₁-(10)
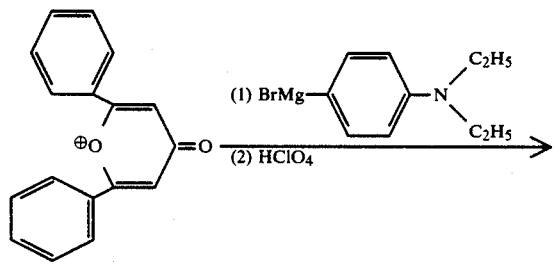
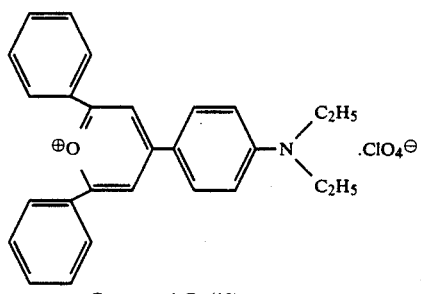
Compound C₁-(10)
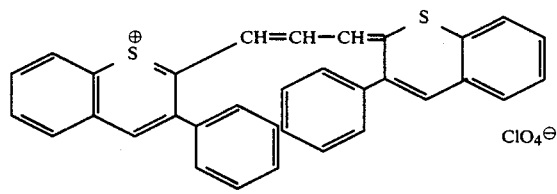
C₂-(1)

-continued
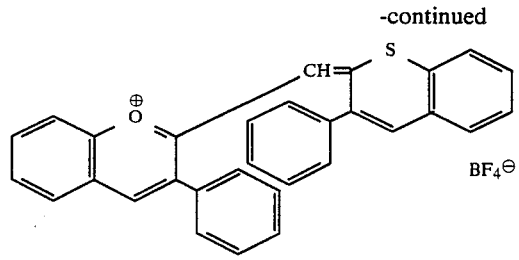
C₂-(2)
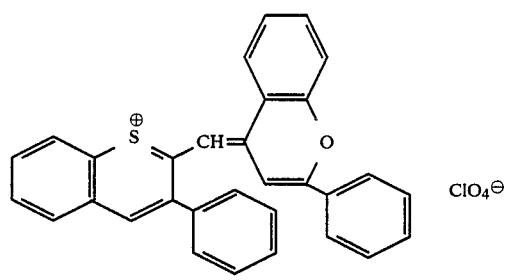
C₂-(3)
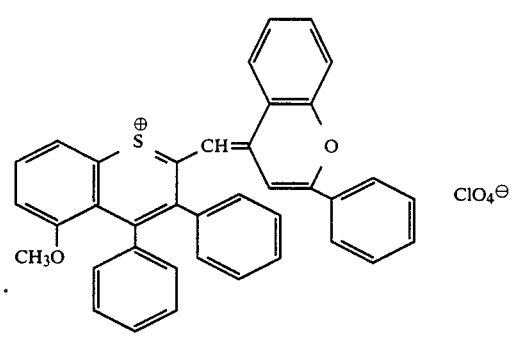
C₂-(4)
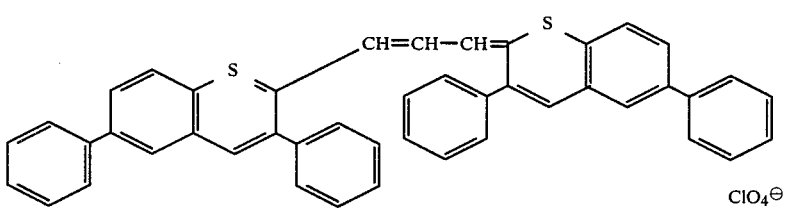
C₂-(5)
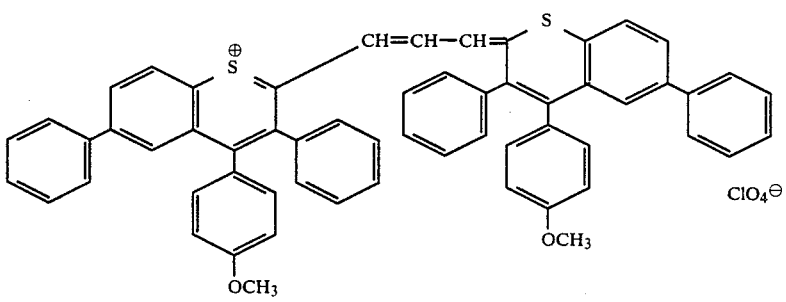
C₂-(6)
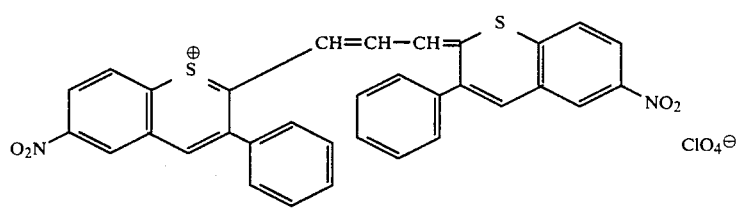
C₂-(7)

-continued
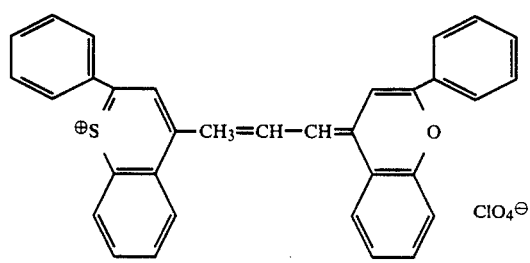
C₂-(8)
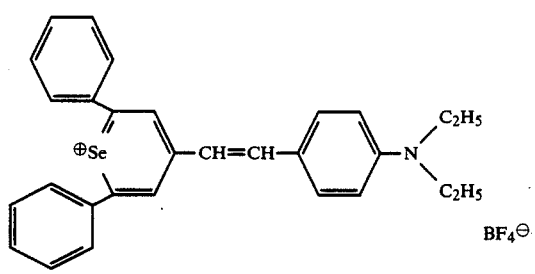
C₂-(9)
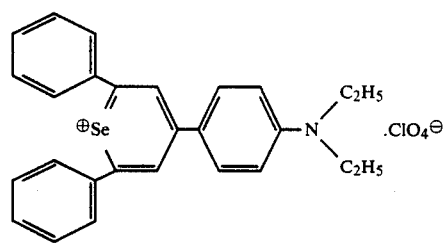
C₂-(10)
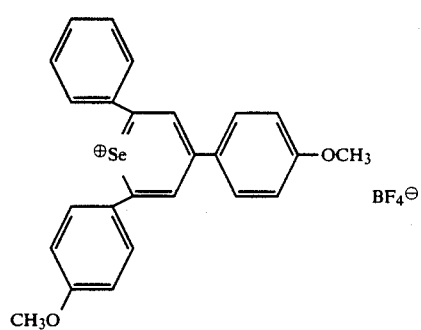
C₂-(11)
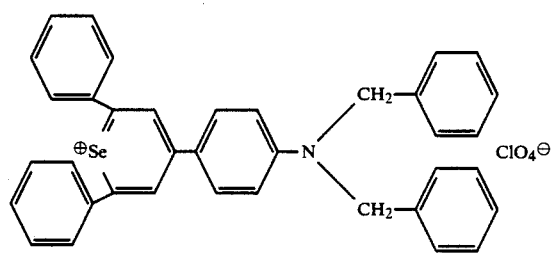
C₂-(12)
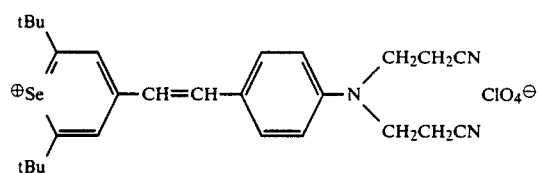
C₂-(13)

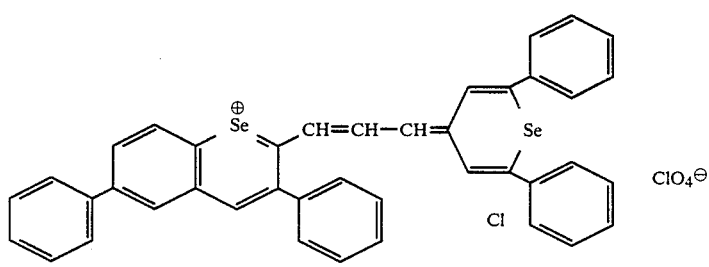
C2-(14)
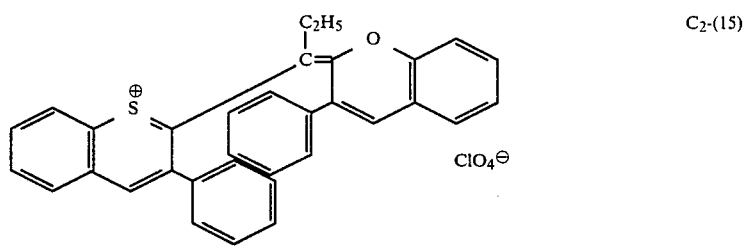
C2-(15)
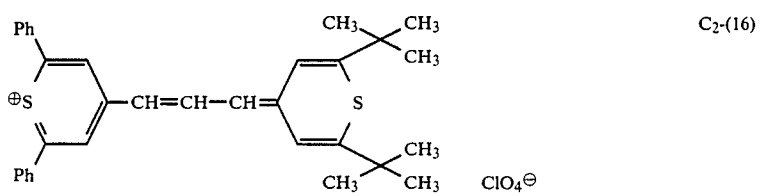
C2-(16)
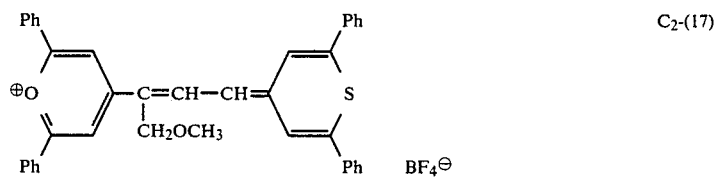
C2-(17)
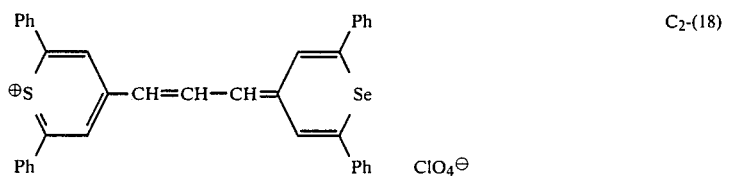
C2-(18)
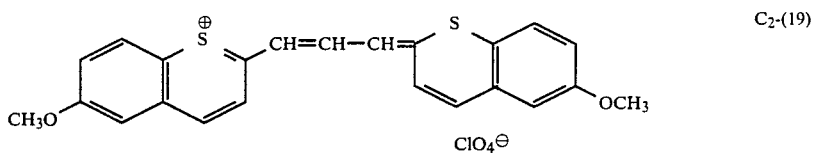
C2-(19)
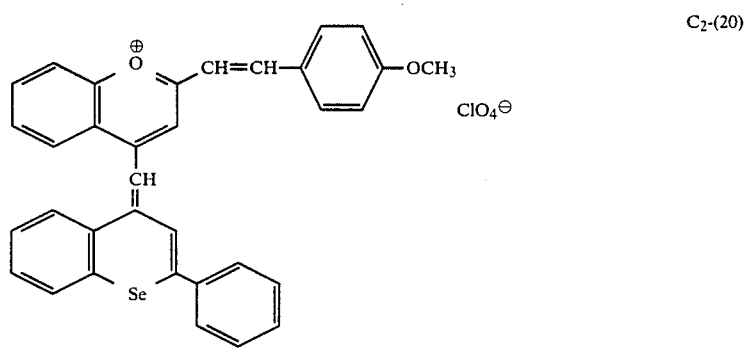
C2-(20)

C2-(21)
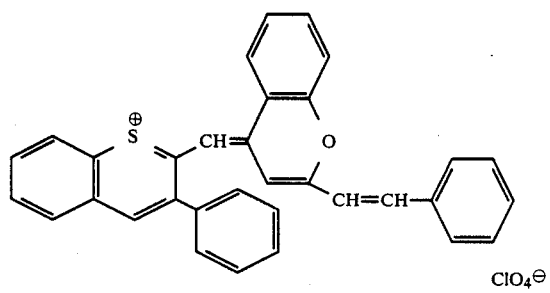
These thiapyrylium compounds and selenapyrilium compounds are known to use in an electrophotographic material and they can be synthesized according to known processes, for example, as disclosed in U.S. Pat. No. 4,283,475 and JP-A-62-71965. For example, Compounds C2-(3), C2-(5) and C3-(10) can be synthesized through the following reaction scheme:
Compound C2-(3)
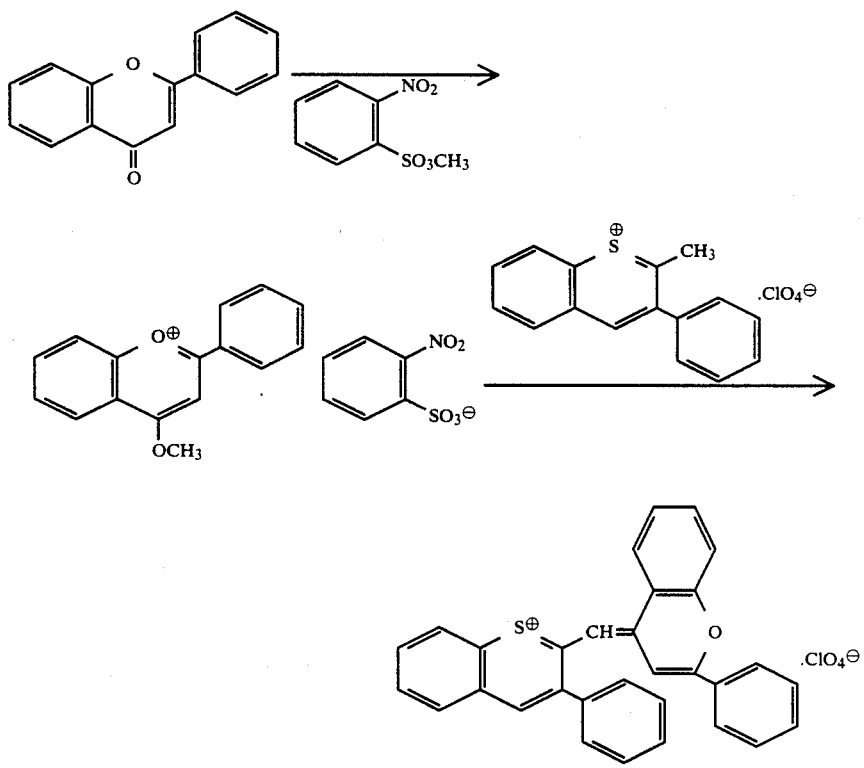
Compound C2-(3)
Compound C2-(5)
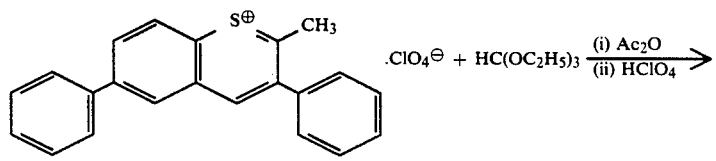

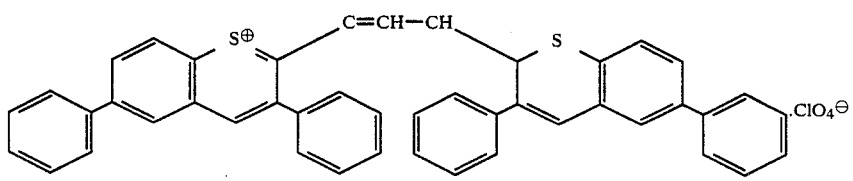

Compound C₂-(5)

Compound C₂-(10)

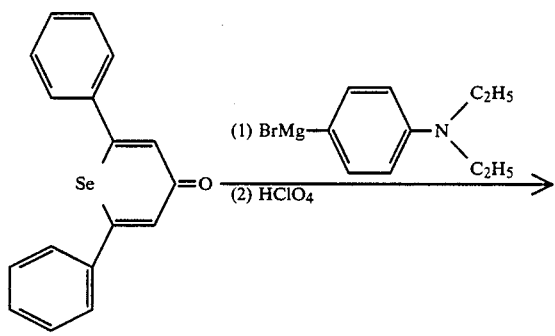

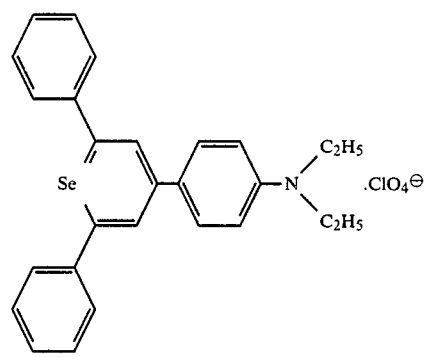

Compound C₂-(10)

In formula (D), each alkyl, alkenyl, aralkyl and aryl group represented by $R_{41}$, $R_{42}$, $R_{45}$ and $R_{47}$ preferably has from 1 to 10 carbon atoms, and the alkenyl group and the alkyl moiety in groups represented by $R_{43}$, $R_{44}$, $R_{46}$ and $R_{46}'$ preferably has from 1 to 4 carbon atoms.

In formula (D), substituents of the substituted groups represented by $R_{41}$, $R_{42}$, $R_{43}$, $R_{44}$, $R_{45}$, $R_{46}$, $R_{46}'$, or $R_{47}$; include a cyano group, a hydroxyl group, a carboxyl group, a nitro group, a halogen atom (e.g., chlorine nd bromine), an amino group, an alkoxy group, an aryl group, an aryloxy group, an alkoxycarbonyl group, an acyloxy group, an amino group substituted with an alkyl, aryl or aralkyl group, a trifluoromethyl groups, etc. Carbon numbers of the alkyl moiety in these groups are preferably from 1 to 8.

Specific examples of $R_{41}$, $R_{42}$, $R_{45}$ or $R_{47}$ are methyl, ethyl, propyl, butyl, octyl, isobutyl, 2-ethylhexyl, methoxyethyl, N,N-dimethylaminoethyl, cyanoethyl, phenyl, naphthyl, styryl, methoxyphenyl, p-methylphenyl, o-methylphenyl, p-methoxystyryl, N,N-diethylaminophenyl, N,N-diethylaminostyryl, benzyl, p-methoxynaphthyl, N,N-dimethylaminobenzyl, naphthyl, methoxynaphthyl groups. In particular, for obtaining high sensitivity, $R_{41}$ and $R_{42}$ are preferably aryl groups.

Specific examples of $R_{43}$, $R_{44}$, $R_{46}$ or $R_{46}'$ are hydrogen, fluorine, chlorine, bromine, and iodine atoms, and nitro, cyano, trifluoromethyl, methoxycarbonyl, ethoxycarbonyl, propoxycarbonyl, acetoxy, ethylcarbonyloxy, butylcarbonyloxy, methyl, ethyl, propyl, butyl, octyl, isobutyl, 2-ethylhexyl, methoxyethyl, N,N-dimethylaminoethyl, cyanoethyl, chloroethyl, chloromethyl, acetoxyethyl, phenyl, naphthyl, styryl, methoxyphenyl, p-methylphenyl, o-methylphenyl, p-methoxystyryl, N,N-diethylaminophenyl, benzyl, p-methoxybenzyl, and N,N-dimethylaminobenzyl groups.

Specific but non-limitative examples of the styryl dyes represented by formula (D) are shown below.

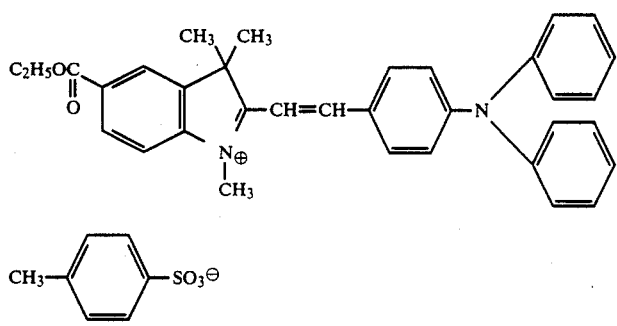
D-(1)
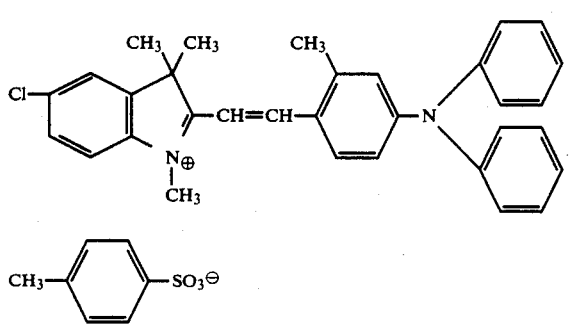
D-(2)
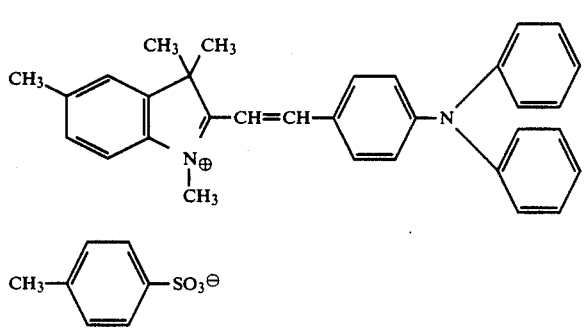
D-(3)
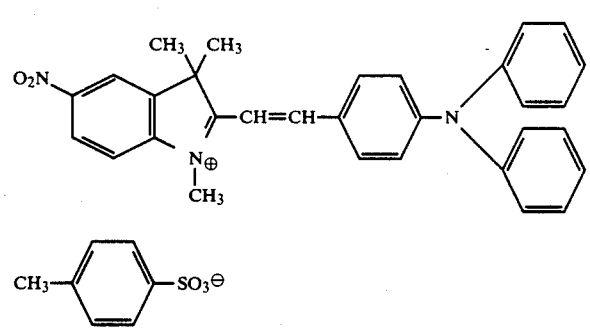
D-(4)
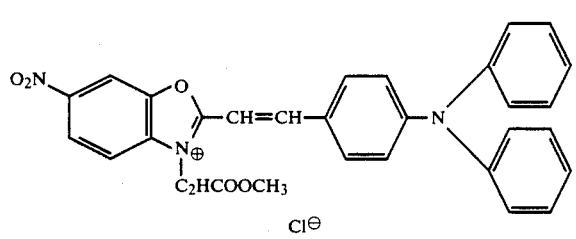
D-(5)

-continued
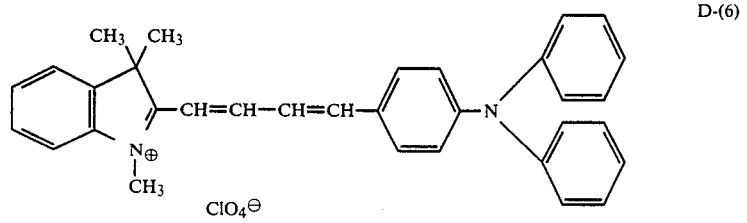
D-(6)
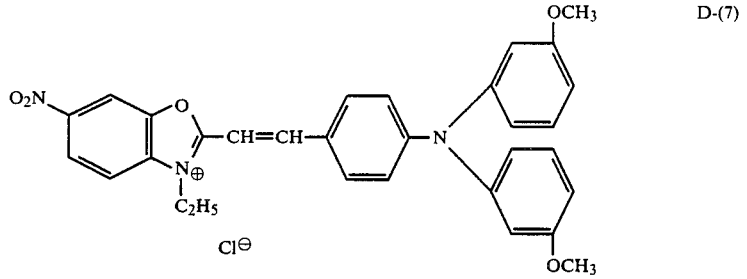
D-(7)
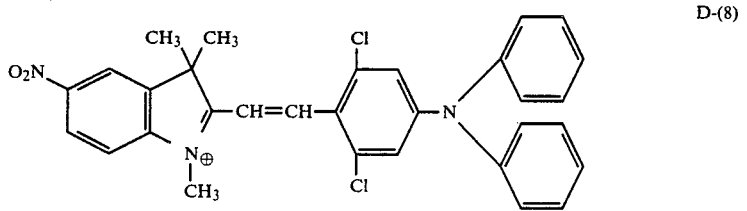
D-(8)
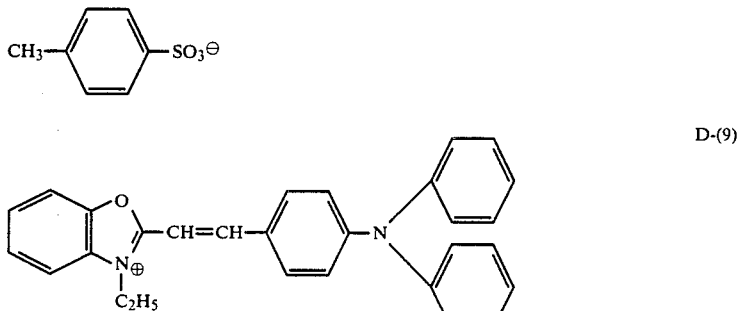
D-(9)
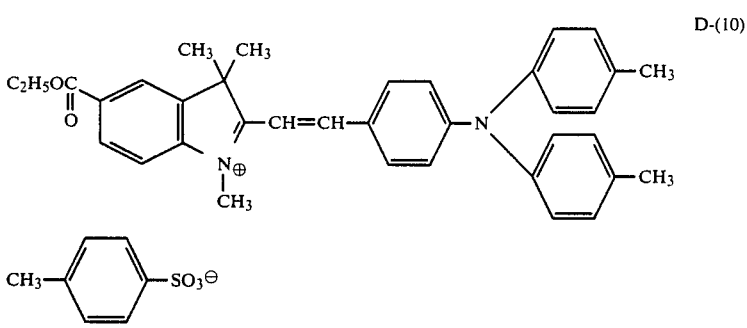
D-(10)
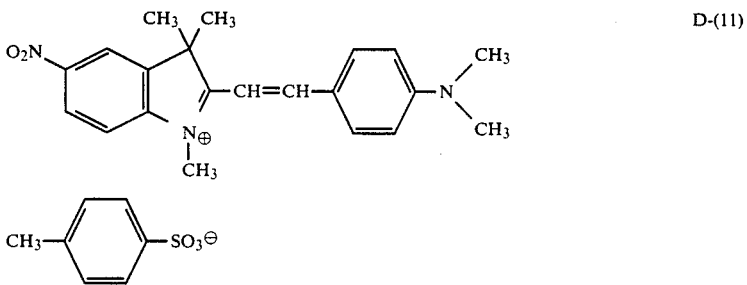
D-(11)

-continued
D-(12)
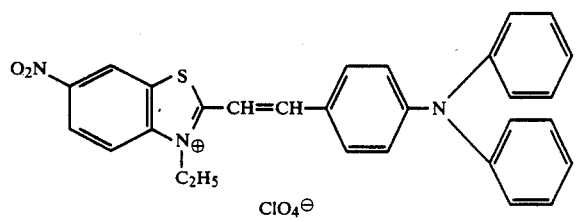
D-(13)
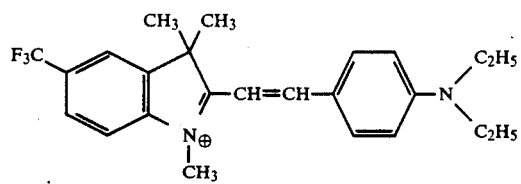
D-(14)
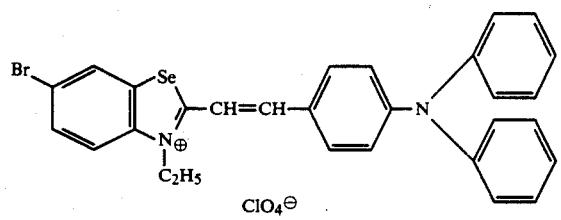
D-(15)
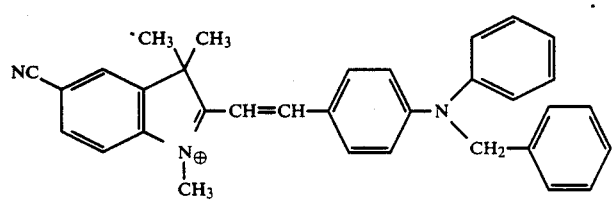
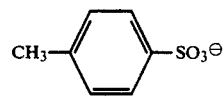
D-(16)
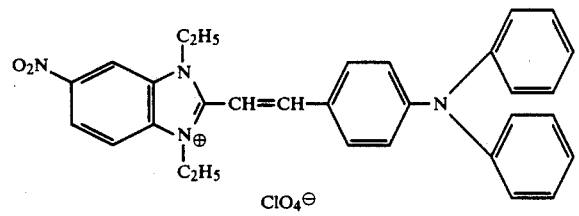
D-(17)
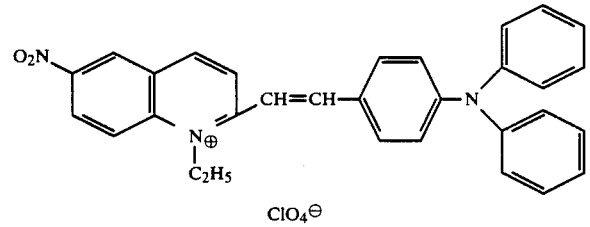

-continued

D-(18)

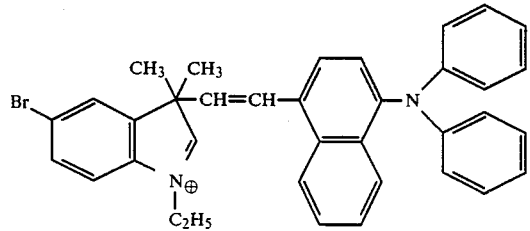

D-(19)

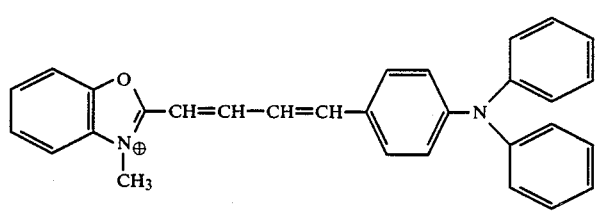

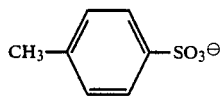

D-(20)

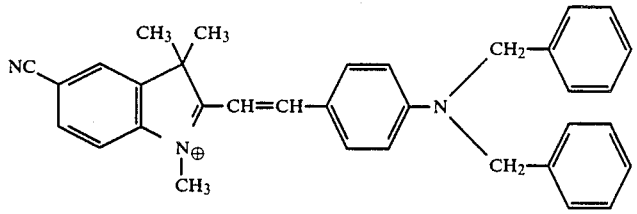

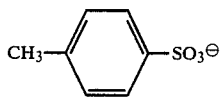

D-(21)

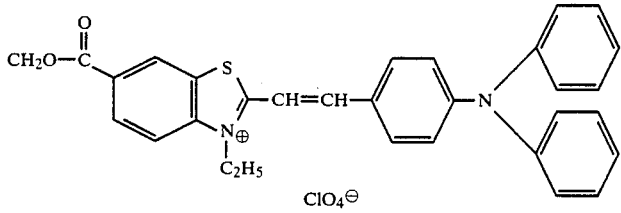

These styryl dyes of formula (D) can be synthesized by known processes. For example, they can be synthesized by condensing a compound represented by formula

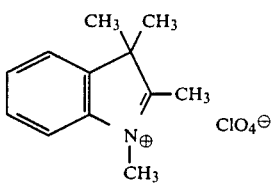

with a compound represented by formula:

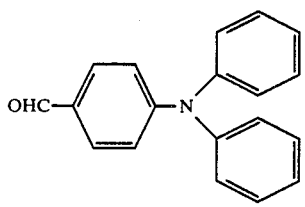

under heating either in an alcohol in the presence of piperidine or in acetic anhydride.

These syntheses can easily be carried out in accordance with the descriptions, e.g., of *J. Chem. Soc.*, Vol. 123, 2288–2296 (1923).

Furthermore, the compounds represented by formula (D) are known to use in an electrophotographic material and it is disclosed in, for example, Yamanouchi et al., *Denshi Shashin* (Electrophotography) 9, Vol. 12 (1973) and in references cited therein.

In formula (E), $A_1$ and $A_2$ may be the same or different.

Each alkyl and alkenyl groups and each alkyl moiety in each acyl, aralkyl, aryl, alkoxy, aryloxy and alkoxycarbonyl groups represented by $R_{51}$ to $R_{54}$ in formula (E) preferably has from 1 to 8 carbon atoms and each alkyl, alkenyl, aralkyl, and aryl groups represented by $R_{55}$ to $R_{57}$ preferably ahs from 1 to 12 carbon atoms.

In formula (E), substituents for the substituted groups represented by $R_{51}$, $R_{52}$, $R_{53}$, $R_{54}$, $R_{55}$, $R_{56}$, $R_{57}$ or Q include a cyano group, a hydroxyl group, a carboxyl group, a nitro group, a halogen atom, an amino group, an alkoxy group, an aryl group, an aryloxy group, an alkoxycarbonyl group, an acyloxy group, an amino group substituted with at least one of alkyl, aryl or aralkyl group, a trifluoromethyl group, etc. The alkyl moiety in these substituents preferably has from 1 to 8 carbon atoms.

Specific examples of $R_{51}$, $R_{52}$, $R_{53}$, or $R_{54}$ are hydrogen, fluorine, chlorine, bromine, and iodine atoms, nitro, cyano, trifluoromethyl, methoxycarbonyl, ethoxycarbonyl, propoxycarbonyl, acetoxy, ethylcarbonyloxy, butylcarbonyloxy, methyl, ethyl, propyl, butyl, octyl, isobutyl, 2-ethylhexyl, methoxyethyl, N,N-dimethylaminoethyl, cyanoethyl, chloroethyl, chloromethyl, acetoxyethyl, phenyl, naphthyl, styryl, methoxyphenyl, p-methylphenyl, o-methylphenyl, p-methoxystyryl, N,N-diethylaminophenyl, benzyl, p-methoxybenzyl, and N,N-dimethylaminobenzyl groups.

Specific examples of $R_5$, $R_{56}$, or $R_{57}$ are methyl, ethyl, propyl, butyl, octyl, isobutyl, 2-ethylhexyl, methoxyethyl, N,N-dimethylaminoethyl, cyanoethyl, phenyl, naphthyl, styryl, methoxyphenyl, p-methylphenyl, o-methylphenyl, p-methoxystyryl, N,N-diethylaminophenyl, benzyl, p-methoxybenzyl, N,N-dimethylaminobenzyl, and methoxynaphthyl groups.

The divalent aromatic hydrocarbon groups as represented by Q includes phenylene, naphthylene, and anthrylene groups. The divalent aromatic heterocyclic groups as represented by Q includes furan, pyrrole, thiophene, benzofuran, indole, thiazole, and imidazole rings.

Specific but non-limitative examples of the cyanide dyes represented by formula (I) are shown below.

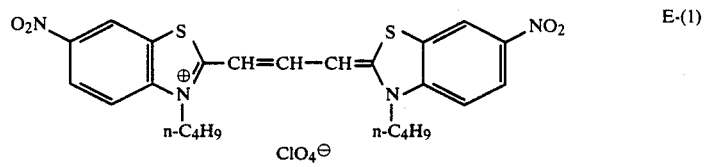

E-(1)

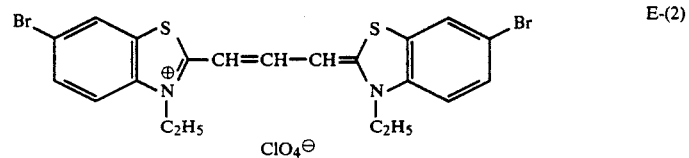

E-(2)

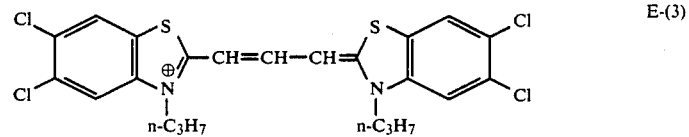

E-(3)

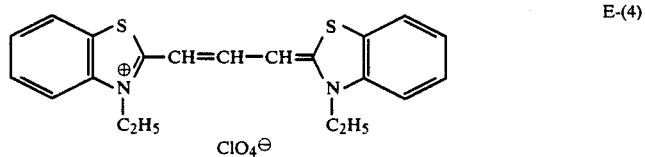

E-(4)

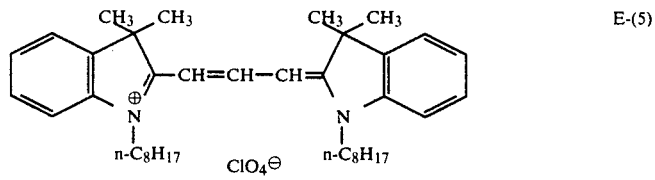

E-(5)

-continued
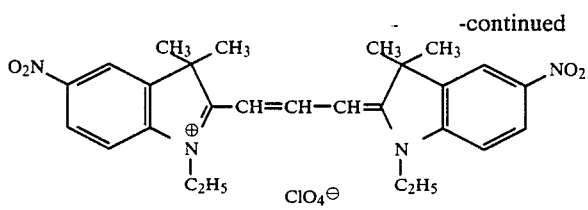 E-(6)
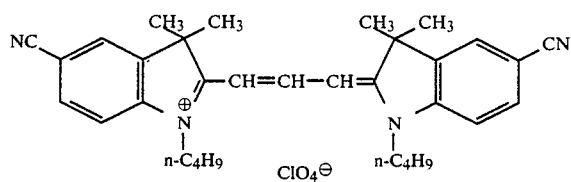 E-(7)
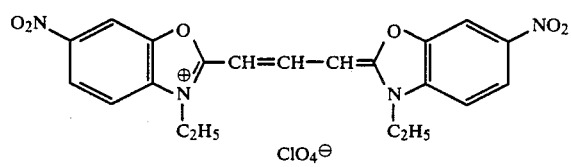 E-(8)
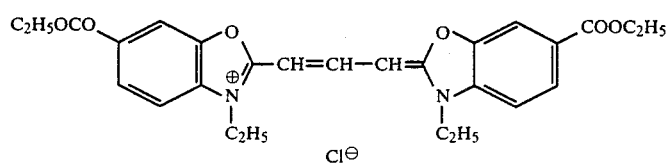 E-(9)
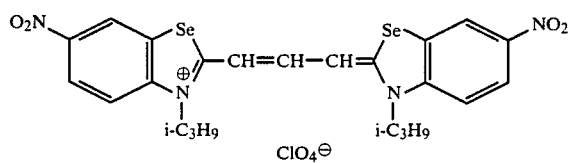 E-(10)
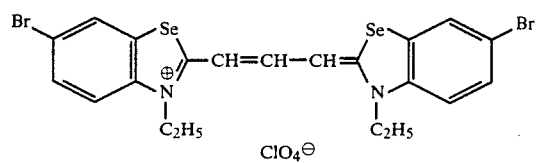 E-(11)
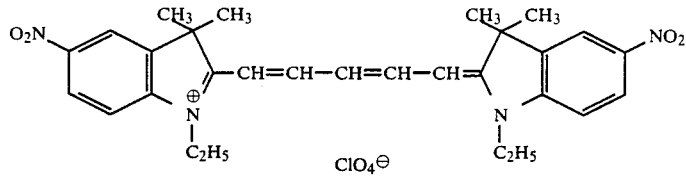 E-(12)
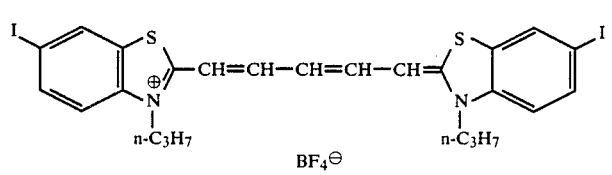 E-(13)
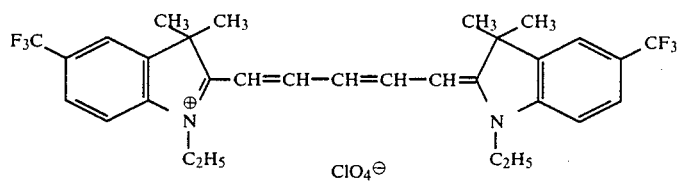 E-(14)

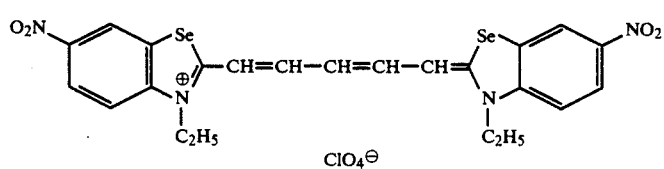 E-(15)
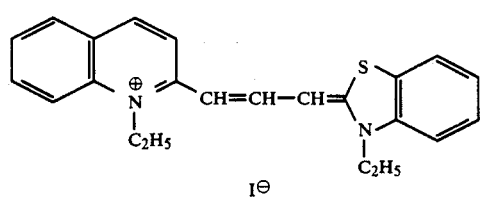 E-(16)
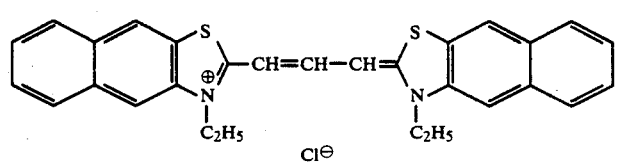 E-(17)
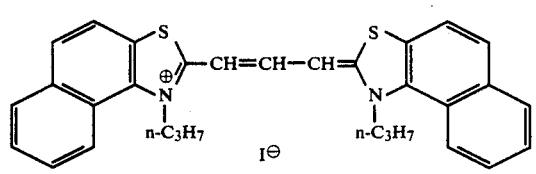 E-(18)
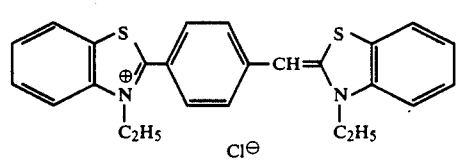 E-(19)
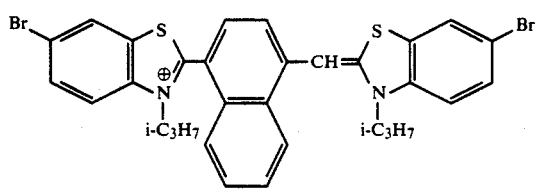 E-(20)
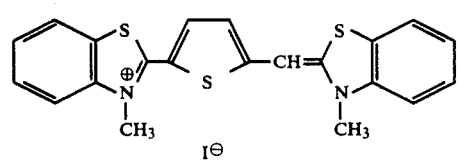 E-(21)
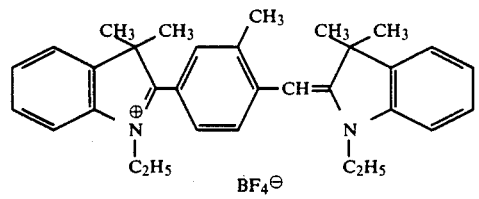 E-(22)

-continued
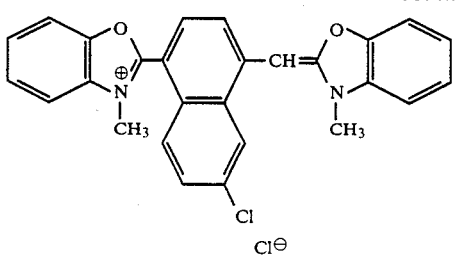 E-(23)
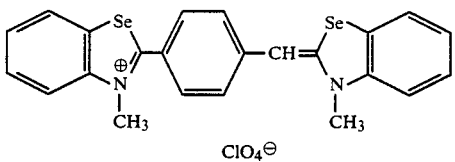 E-(24)
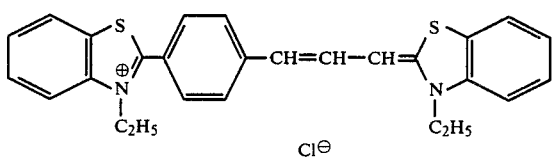 E-(25)
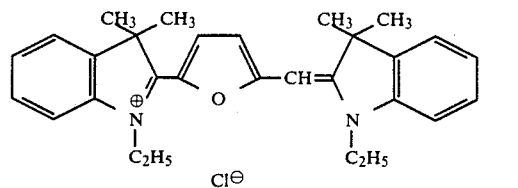 E-(26)
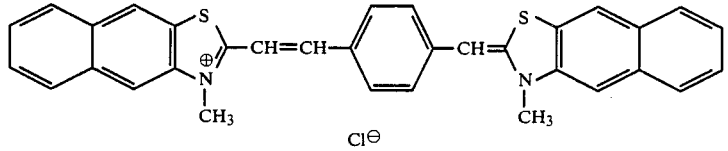 E-(27)
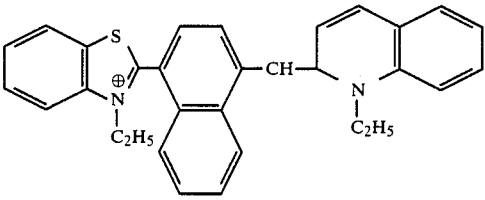 E-(28)
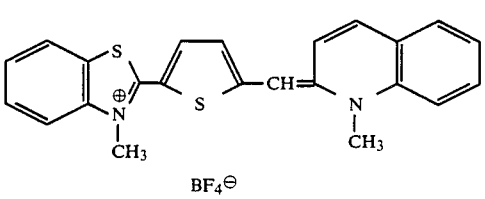 E-(29)
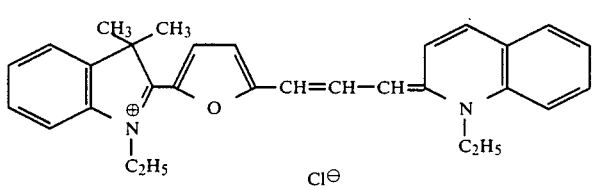 E-(30)
These cyanaine dyes conventionally used in an electrophotographic material as disclosed, for example, in Y.

For example, E-(19) and E-(28) can be synthesized by the following reaction scheme:

Compound E-(19)

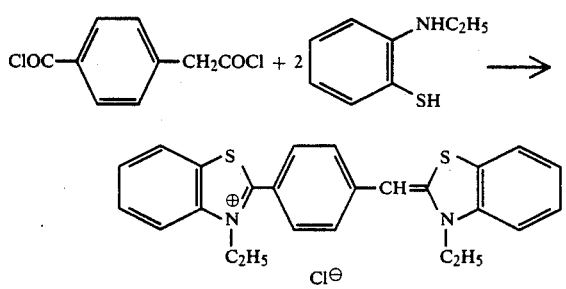

Compound E-(28)

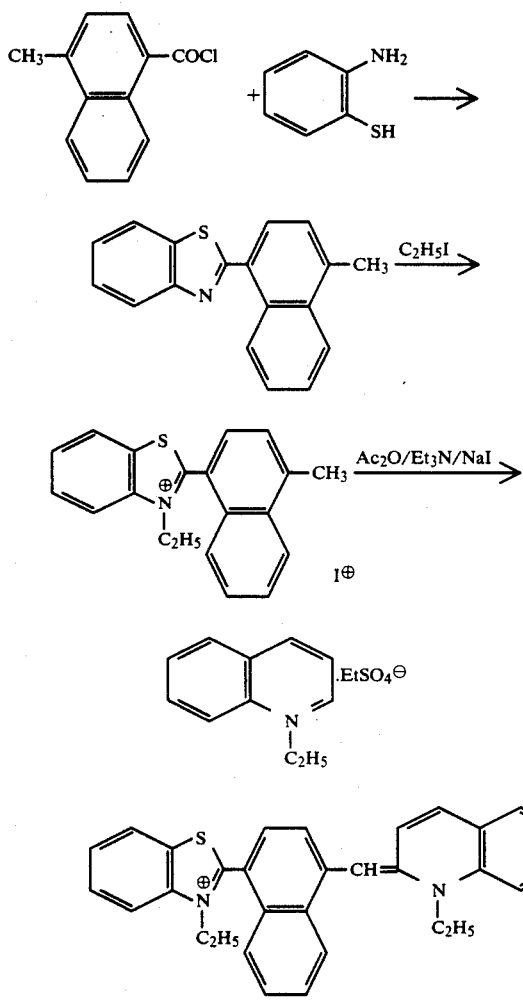

These cyanine compounds can be obtained by applying the process described in Zh. Org. Kim., Vol. 4, 1089–1094 and 2207 to 2212 (1968).

The amide compounds represented by formulae (I) to (III) further sensitize an organic photoconductive compound having been sensitized with the above-described sensitizing dye. Addition of these compounds to a dye-sensitized organic photoconductive compound achieves high electrophotographic sensitivity which cannot be attained by using sensitizing dyes alone, particularly favoring an electrophotographic printing plate with improved sensitivity that has hardly been attained because of the limit of the amount of an organic photoconductive compound that can be incorporated relative to an alkali-soluble or dispersible binder resin, arising from poor compatibility therebetween.

In formulae (II) to (III), the alkyl group represented by $R_{11}$, $R_{12}$ or $R_{13}$ includes substituted or unsubstituted and straight chain or branched alkyl groups having from 1 to 22 carbon atoms. Substituents for these alkyl groups include a halogen atom (e.g., chlorine, bromine, and fluorine atoms), a cyano group, a nitro group, a phenyl group, and a tolyl group.

The substituted or unsubstituted alkoxy group as represented by $R_{11}$, $R_{12}$ or $R_{13}$ includes those having the above-recited substituted or unsubstituted alkyl groups.

The monocyclic or bicyclic aryl group as represented by $R_{11}$, $R_{12}$ or $R_{13}$ includes phenyl and naphthyl groups. In this case either one of $R_{12}$ and $R_{13}$ is preferably a hydrogen atom.

When $R_{11}$, $R_{12}$ or $R_{13}$ is a substituted monocyclic or bicyclic aryl group it may have 1 to substituents selected from a halogen atom (e.g., chlorine, bromine, and fluorine atoms), a cyano group, a nitro group, and a straight chain or branched alkyl group having from 1 to 5 carbon atoms, a substituted straight chain or branched alkyl group having from 1 to 22 carbon atoms (as a substituent, a halogen atom (e.g., chlorine, bromine, and fluorine atoms, a cyano group, a nitro group, a phenyl group or a tolyl group), a straight chain or branched alkoxy group having from 1 to 5 carbon atoms, an alkoxycarbonyl group having a straight chain or branched alkyl group having from 1 to 5 carbon atoms, and an acyl group having a straight chain or branched alkyl group having from 1 to 5 carbon atoms. When either one of $R_{12}$ and $R_{13}$ is the substituted aryl group, the other is preferably a hydrogen atom.

The substituted or unsubstituted and monocyclic or bicyclic aryloxy group as represented by $R_{11}$, $R_{12}$ or $R_{13}$ includes those having the above-enumerated substituted or unsubstituted aryl groups. When either one of $R_{12}$ and $R_{13}$ is the substituted or unsubstituted aryloxy group, the other is preferably a hydrogen atom.

The monovalent group derived from a substituted or unsubstituted and monocyclic or bicyclic condensed heterocyclic ring, as represented by $R_{11}$, $R_{12}$ or $R_{13}$ preferably is a 5- to 7-membered ring having at least one of N, O, and S atoms in the ring, and includes pyrrolidinyl, piperidinyl, piperidino, morpholinyl, morpholino, pyrrolyl, imidazolyl, pyridyl, pyrimidinyl, indolinyl, isoindolinyl, indolyl, isoindolyl, benzimidazolyl, quinolyl, and isoquinolyl groups each of which may have 1 to 3 substituents selected from a halogen atom (e.g., chlorine, bromine, and fluorine atoms), a cyano group, a nitro group, a phenyl group, a tolyl group, a benzyl group, a phenethyl group, and a straight chain or branched alkyl group having from 1 to 5 carbon atoms. When either one of $R_{12}$ and $R_{13}$ represents the heterocyclic group, the other is preferably a hydrogen atom.

When $R_{11}$ and $R_{12}$, or $R_{12}$ and $R_3$ in formula (III); $R_{12}$ and $R_{13}$ in formula (IV); are connected to each other to form a divalent group, examples of such a divalent group include a trimethylene group, a tetramethylene group, a pentamethylene group, an oxydiethylene group ($—CH_2—CH_2—O—CH_2—CH_2—$), and these divalent groups wherein 1 to 3 hydrogen atoms are substituted with a halogen atom (e.g., chlorine, bromine, and fluorine atoms), a cyano group, a nitro group, a phenyl group, a tolyl group, a benzyl group, a phenethyl group, or a straight chain or branched alkyl group having from 1 to 5 carbon atoms. When $R_{11}$ to $R_{13}$ each represents an alkyl, alkoxy, aryl, aryloxy or heterocyclic group having 2 or 3 substituents, these substituents may have any combination.

The polymethylene group as represented by $R_{14}$ includes those having from 2 to 22 carbon atoms.

The branched alkanediyl group as represented by $R_{14}$ includes those having from 3 to 22 carbon atoms and having a free valence on each of two carbon atoms thereof at arbitrary positions.

The arylene group as represented by $R_{14}$ includes a o-, m- or p-phenylene group and a naphthylene group having a free valence on each of two carbon atoms thereof at arbitrary positions.

The amide compounds represented by formulae (I), (II) and (III) and synthetic methods therefor are disclosed in U.S. Pat. No. 4,497,167 and references cited therein.

Typical but non-limitative examples of the amide compounds represented by formulae (I), (II), and (III) are shown below.

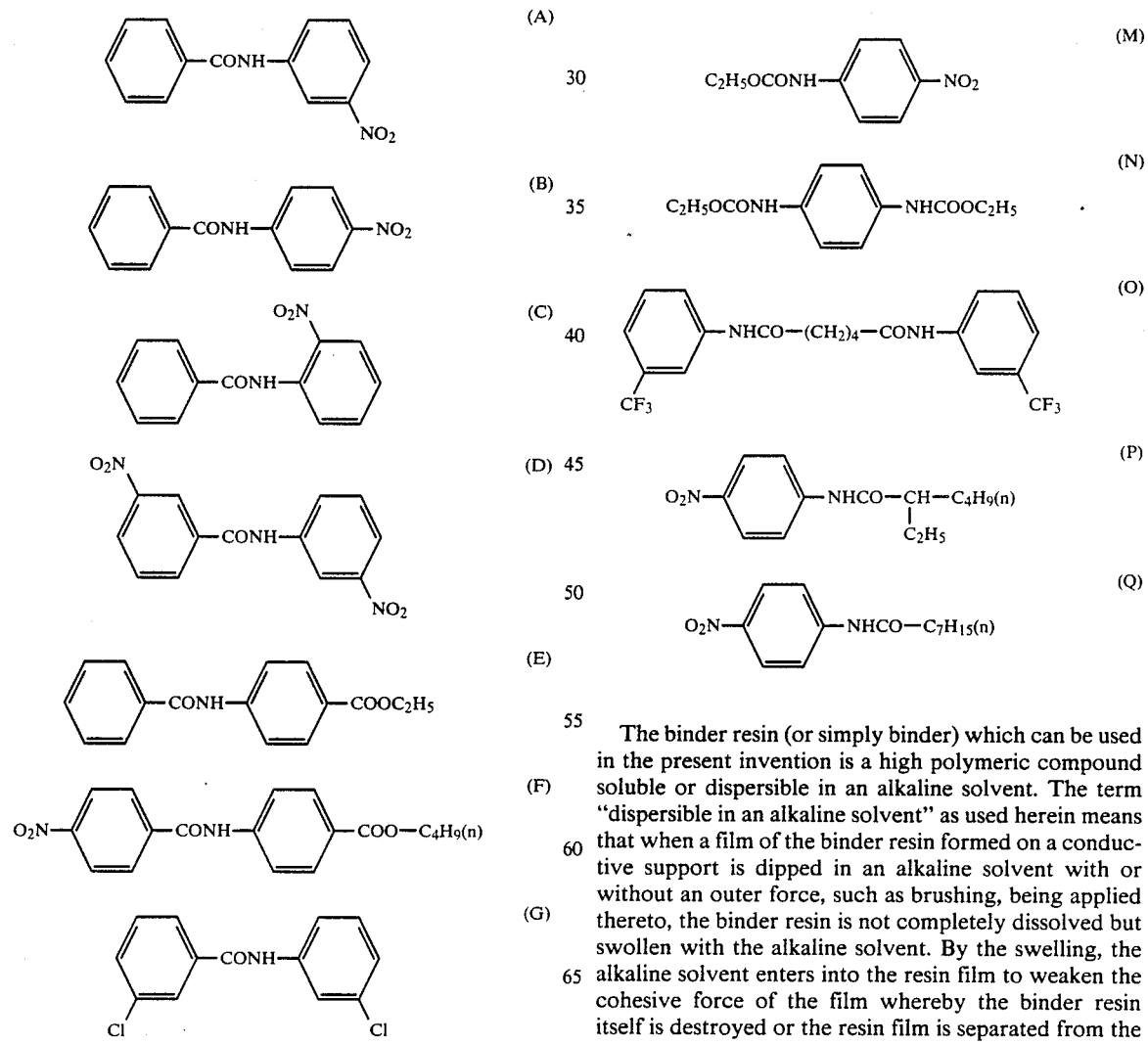

The binder resin (or simply binder) which can be used in the present invention is a high polymeric compound soluble or dispersible in an alkaline solvent. The term "dispersible in an alkaline solvent" as used herein means that when a film of the binder resin formed on a conductive support is dipped in an alkaline solvent with or without an outer force, such as brushing, being applied thereto, the binder resin is not completely dissolved but swollen with the alkaline solvent. By the swelling, the alkaline solvent enters into the resin film to weaken the cohesive force of the film whereby the binder resin itself is destroyed or the resin film is separated from the support. As a result, the binder resin is dispersed in the alkaline solvent, and the film falls off the conductive support.

Implicit in the alkaline solvent to be used are an aqueous solution containing an alkaline compound, an organic solvent containing an alkaline compound, and a mixture of an aqueous solution and an organic solvent containing an alkaline compound. The alkaline compound includes organic or inorganic compounds, such as sodium hydroxide, potassium hydroxide, sodium carbonate, sodium silicate, sodium metasilicate, sodium phosphate, ammonia, and amino-alcohols (e.g., monoethanolamine, diethanol amine, and triethanolamine). The organic solvent to be used is not particularly limited.

Preferred alkaline solvents are an alkaline aqueous solution, an alcoholic solvent containing an alkaline compound, and a mixture of an alkaline aqueous solution and an alcoholic solvent.

The alkaline aqueous solution preferably has a pH of 7 or higher, more preferably from 8 to 13.5. Specific examples of the alkaline aqueous solution include an aqueous solution of sodium hydroxide, potassium hydroxide, sodium carbonate, sodium silicate, sodium metasilicate, sodium phosphate, ammonia, and an amino-alcohol (e.g., monoethanolamine, diethanolamine, triethanolamine) The alcoholic solvent includes lower alcohols (e.g., methanol, ethanol, propanol, and butanol), aromatic alcohols (e.g., benzyl alcohol and phenethyl alcohol), ethyene glycol, diethylene glycol, triethylene glycol, polyethylene glycol, cellosolves, and amino-alcohols (e.g., monoethanolamine, diethanolamines, and triethanolamine). These alcoholic solvents may be used as a mixture with the above-described alkaline aqueous solution at an arbitrary ratio, preferably at a ratio of 90% by weight or less based on the mixed solution.

The binder resin to be used includes copolymers of an acrylic ester, a methacrylic ester, styrene, vinyl acetate, etc. and a monomer containing a carboxyl group or an acid anhydride group (e.g., acrylic acid, methacrylic acid, itaconic acid, crotonic acid, maleic acid, maleic anhydride, fumaric acid, etc.), such as a styrene-maleic anhydride copolymer, a styrene-maleic anhydride monoalkyl ester copolymer, a methacrylic acid-methacrylic ester copolymer, a styrene-methacrylic acid-methacrylic ester copolymer, an acrylic acid-methacrylic ester copolymer, a styrene-acrylic acid-methacrylic acid copolymer, a vinyl acetate-crotonic acid copolymer, and a vinyl acetatecrotonic acid-methacrylic ester copolymer; copolymers containing methacrylamide, vinylpyrrolidone, or a monomer having a phenolic hydroxyl group, a sulfo group, a sulfonamido group or a sulfonimido group; phenolic resins; partially saponified vinyl acetate resins, xylene resins, and vinyl acetal resins (e.g., polyvinyl butyral).

Among them, the copolymers containing a monomer component having an acid anhydride group or a carboxyl group and phenolic resins are preferred as they provide a photoconductive insulating layer having a high charge retention when used as an electrophotographic printing plate.

The copolymers containing a monomer component having an acid anhydride group preferably include a copolymer of styrene and maleic anhydride. Half esters of these copolymers can also be used. The copolymers containing a monomer component having a carboxyl group preferably include binary or higher order copolymers comprising acrylic acid or methacrylic acid and an alkyl, aryl or aralkyl ester of acrylic acid or methacrylic acid. In addition, a vinyl acetate-crotonic acid copolymer and a terpolymer comprising vinyl acetate, a vinyl ester of a carboxylic acid having from 2 to 18 carbon atoms, and crotonic acid are also preferred. Of the phenolic resins, particularly preferred are novolak resins obtained by condensation of phenol or o-, m- or p-cresol and formaldehyde or acetaldehyde under acidic conditions.

The organic photoconductive substance which can be used in the electrophotographic printing plate of the present invention can be selected from conventionally known substances as shown below:

(1) Triazole derivatives described, in, e.g., U.S. Pat. No. 3,112,197.

(2) Oxadiazole derivatives described in, e.g., U.S. Pat. No. 3,189,447.

(3) Imidazole derivatives described in, e.g., JP-B-37-16096.

(4) Polyarylalkane derivatives described in, e.g., U.S. Pat. Nos. 3,615,402, 3,820,989,and 3,542,544, JP-B-45-555 and 51-10983, and JP-A-51-93224, 55-17105, 56-4148, 55-108667, 55-156953, and 56-36656.

(5) Pyrazoline derivatives and pyrazolone derivatives described in, e.g., U.S. Pat. Nos. 3,180,729 and 4,278,746, JP-A-55-88064, 55-88065, 49-105537, 55-51086, 56-80051, 56-88141, 57-45545, 54-112637, and 55-74546.

(6) Phenylenediamine derivatives described in, e.g., U.S. Pat. No. 3,615,404, JP-B-51-10105, JP-A-54-83435, 54-110836, and 54-119925, and JP-B-46-3712 and 47-28336.

(7) Arylamine derivatives described in, e.g., U.S. Pat. No. 3,567,450, JP-B-49-35702, West German Patent (DAS) 1110518, U.S. Pat. No. 3,180,703, 3,240,597, 3,658,520, 4,232,103, 4,175,961, and 4,012,376, JP-A-55-144250 and 56-119132, JP-B-39-27577, and JP-A-56-22437.

(8) Amino-substituted chalcone derivatives described in, e.g., U.S. Pat. No. 3,526,501.

(9) N,N-bicarbazyl derivatives described in, e.g., U.S. Pat. No. 3,542,546.

(10) Oxazole derivatives described in, e.g., U.S. Pat. No. 3,257,203.

(11) Styrylanthracene derivatives described in, e.g., JP-A-56-46234.

(12) Fluorenone derivatives described in, e.g., JP-A-54-110837.

(13) Hydrazone derivatives described in, e.g., U.S. Pat. No. 3,717,462, JP-A-54-59143 (corresponding to U.S. Pat. No. 4,150,987), 55-52063, 55-52064, 55-46760, 55-85495, 57-11350, 57-148749, and 57-64244.

(14) Benzidine derivatives described in, e.g., JP-B-39-11546, JP-A-55-79450 (corresponding to U.S. Pat. No. 4,265,990), and U.S. Pat. No. 4,047,949.

The conductive support which can be used in the present invention includes those having a hydrophilic surface, such as plastic sheets having a conductive surface, paper having been rendered impermeable to solvents and electrically conductive, an aluminum sheet, a zinc sheet, a bimetal sheet (e.g., a copper-aluminum sheet, a copper-stainless steel sheet, and a chromium-copper sheet), and a trimetal sheet (e.g., a chronium-copper-aluminum sheet, a chromium-zinc-iron sheet, and a chromium-copper-stainless steel sheet). The thickness of the support is preferably from 0.1 to 3 mm, more preferably from 0.1 to 1 mm.

It is preferable that a support having an aluminum surface be subjected to surface treatment for rendering its surface hydrophilic, such as graining, immersion in an aqueous solution of sodium silicate, potassium fluorozirconate, a phosphoric acid salt, etc., or anodic oxidation. An aluminum sheet having been grained and then immersed in a sodium silicate aqueous solution as disclosed in U.S. Pat. No. 2,714,066; and an aluminum sheet having been anodically oxidized and then immersed in an aqueous solution of an alkali metal silicate as disclosed in JP-B-47-5125 can also be used to advantage.

The above-mentioned anodic oxidation can be carried out by passing electricity in an electrolytic solution comprising one or more of an aqueous or non-aqueous solution of an inorganic acid (e.g., phosphoric acid, crotonic acid, sulfuric acid, and boric acid), an organic acid (e.g., oxalic acid and sulfamic acid), or a salt thereof using an aluminum sheet as an anode.

Electrodeposition of a silicate as described in U.S. Pat. No. 3,658,662 and treatment with polyvinylsulfonic acid as disclosed in West German Patent Publication No. 1,621,478 are also effective surface treatments.

These surface treatments are not only for rendering the surface of a support hydrophilic but also for preventing unfavorable reactions with the electrophotographic photosensitive layer formed thereon or for improving adhesion to the electrophotographic photosensitive layer.

For the purpose of improving adhesion between the conductive support and the electrophotographic photosensitive layer or for improving the electrostatic characteristics of the photosensitive layer, an alkali-soluble intermediate layer comprising casein, polyvinyl alcohol, ethyl cellulose, a phenolic resin, a styrene-maleic anhydride copolymer, polyacrylic acid, etc. may be provided between the conductive support and the photosensitive layer.

For the purpose of improving the electrostatic characteristics of the photosensitive layer, the developability with a toner, or the image quality, an overcoat layer which is removable on etching together with the photosensitive layer may be provided on the photosensitive layer. The overcoat layer may be a mechanically matted layer or a resin layer containing a matting agent. Included in the matting agent are silicon dioxide, zinc oxide, titanium oxide, zirconium oxide, glass beads, alumina, starch, polymer particles (e.g., particles of polymethyl methacrylate, polystyrene or phenolic resins), and the matting agents described in U.S. Pat. Nos. 2,710,245 and 2,992,101. These matting agents may be used either individually or in combinations of two or more thereof. The resin in which the matting agent is incorporated can be selected appropriately depending on the etching solution to be combined therewith. Specific examples of the resin include gum arabic, glue, gelatin, casein, cellulose compounds (e.g., viscose, methyl cellulose, ethyl cellulose, hydroxyethyl cellulose, hydroxypropylmethyl cellulose, and carboxymethyl cellulose), starches (e.g., soluble starch and modified starch), polyvinyl alcohol, polyethylene oxide, polyacrylic acid, polyacrylamide, polyvinyl methyl ether, epoxy resins, phenolic resins (particularly novolak phenol resins), polyamide, polyvinyl butyral, and the like. These resins may be used either alone or in combinations of two or more thereof.

In addition to the above-described sensitizing dye, organic photoconductive compound, amido compound and binder resin, the photoconductive insulating layer of the present invention may further contain, if desired, other components, such as plasticizers and surface active agents for improving coating properties.

In the photoconductive layer of the present invention, the ratio of the organic photoconductive compound to the binder resin can be selected within such a range that the photoconductive compound maintains good compatibility with the binder resin without being precipitated. Since too a small content of the organic photoconductive compound only produces extremely low sensitivity, the organic photoconductive compound is usually used in an amount of from 0.05 to 3 parts, preferably from 0.1 to 1.5 parts by weight, per part by weight of the binder resin.

The sensitizing dye of the present invention are used in an amount of from 0.0001 to 30 parts, preferably from 0.01 to 15 parts, by weight per 100 parts by weight of the organic photoconductive compound. The amide compounds of formulae (I), (II), (III) are used in an amount of from 0.01 to 50 parts, preferably from 0.1 to 30 parts, by weight per 100 parts by weight of the organic photoconductive compound.

The electrophotographic printing plate of the present invention can be produced by coating a photoconductive insulating composition on the above-described conductive support, followed by drying to form a layer, generally having from 1 to 10 μm, preferably, from 2 to 7 μm. The coating composition is prepared by uniformly mixing the above-described sensitizing dye, organic photoconductive compound, amide compound, and binder resin in an organic solvent. The organic solvent to be used here includes halogenated hydrocarbons (e.g., dichloromethane, dichloroethane, and chloroform), alcohols (e.g., methanol and ethanol), ketones (e.g., acetone, methyl ethyl ketone, and cyclohexanone), glycol ethers (e.g., ethylene glycol monomethyl ether, ethylene glycol monoethyl ether, 2-methoxyethylacetic acid, and dioxane), and esters (e.g., butyl acetate and ethyl acetate).

The coating on the conductive support can be carried out in a conventional manner, such as by rotation coating, blade coating, knife coating, reverse-roll coating, dip coating, rod bar coating, and spray coating.

In carrying out plate making using the electrophotographic printing plate according to the present invention, the plate is charged substantially uniformly in a dark place using conventional electrophotographic technique and then subjected to scanning exposure with a laser beam to form an electrostatic latent image. Alternatively, a latent image may be formed by reflected light exposure or contact print through a transparent positive film using a xenon lamp, a halogen lamp, a tungsten lamp, or a fluorescent lamp as a light source. It is possible to use an He-Ne laser and a laser light source other than an He-Ne laser as long as the electrophotographic printing plate has sensitivity to the spectral wavelength. The thus exposed plate is then developed with a toner to form a toner image. The photoconductive insulating layer on the non-image area where the toner has not adhered is removed to expose the hydrophilic surface of the support.

The toner image formation can be effected by various known electrophotographic techniques, such as cascade development, magnetic brush development, powder cloud development, liquid development, and the like. After the development, the toner image can be fixed by known methods, such as heat fixation and pressure fixation.

Since the toner image thus formed serves as a resist while the photosensitive layer on the non-image area where the toner has not adhered is removed by an etching solution, it is preferable that the toner contains a resin component exhibiting resistance to the etching solution. Such a resin component is not limited as long as it is resistant to the etching solution capable of removing the photosensitive layer and includes, for example, acrylic resins containing methacrylic acid or a methacrylic ester, vinyl acetate resins, copolymers of vinyl acetate and ethylene or vinyl chloride, vinyl chloride resins, vinylidene chloride resins, vinyl acetal resins (e.g., polyethylene butyral), polystyrene, copolymers of styrene, butadiene and/or a methacrylic ester, polyolefins (e.g., polyethylene and polypropylene), chlorinated polyolefins, polyester resins (e.g., polyethylene terephthalate, polyethylene isophthalate, and polycarbonate of bisphenol A), polyamide resins (e.g., polycapramide, polyhexamethylene adipamide, and polyhexamethylene sebacamide), phenolic resins, xylene resins, alkyd resins, vinylmodified alkyd resins, gelatin, cellulose ester derivatives (e.g., carboxymethyl cellulose), natural and synthesized waxes, and so on.

Considering the relationship between a toner and the surface of the conductive support which is repellent to oily printing inks, the former is lipophilic while the latter is hydrophilic in many cases. The degrees of the lipophilic property and the hydrophilic property are relative to each other. In other words, the term "repellency to oily printing inks" of the surface of the support means that an oily printing ink should not be adhered or retained on the surface of the support in the immediate neighborhood of the toner image, and the term "hydrophilic property" of the surface of the support means that the surface of the support in the immediate neighborhood of the toner image should not be too water-repellent to retain water. Further, the term "lipophilic property" of the toner means that the toner should not be too repellent to oily printing inks to retain them. Therefore, the surface of the conductive support may be repellent to oily printing inks and, at the same time, water-repellent (i.e., hydrophobic).

Solvents having the ability to remove the photoconductive insulating layer can be used as liquid etchants for removing the photoconductive insulating layer from the non-image areas after the formation of the toner image. Alkaline solvents or combinations thereof with surfactants, defoaming agents, organic solvents, or various other appropriate additives may be used as liquid etchants. An alkaline solvent as described hereinbefore is used for etching.

The present invention is now illustrated in greater detail with reference to the following Examples and Comparative Examples, but it should be understood that the present invention is not deemed to be limited thereto. In these examples, all the parts are by weight unless otherwise specified.

EXAMPLE 1

Twenty-five parts of a hydrazone compound of formula:

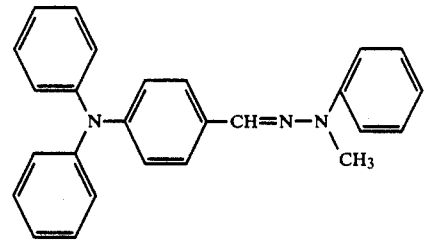

75 parts of a benzyl methacrylate-methacrylic acid copolymer (methacrylic acid content: 30 mol %), 1.18 parts of a sensitizing dye shown in Table 1 and 2.5 parts of amide compound (P) were dissolved in a mixed solvent of 510 parts of methylene chloride and 150 parts of methyl cellosolve acetate. The solution was coated on a 0.25 mm thick grained aluminum sheet and dried to prepare an electrophotographic printing plate having a photoconductive insulating layer.

The resulting printing plate was electrostatically charged to +7.5 kV by corona discharge using an electrostatic copying paper tester ("SP-428" manufactured by Kawaguchi Denki Co., Ltd.), exposed, and electrophotographic characteristics were measured. The surface potential immediately after the charging ($V_0$) and, as a parameter for sensitivity, the exposure necessary for the surface potential before exposure to decrease to ½ and 1/5 by light decay ($E_{50}$ and $E_{80}$, respectively) were measured.

Various samples were prepared using each sensitizing dye shown in Table 1. Furthermore, samples corresponding to the above-described samples but containing no amide compound were prepared. The same measurement as above was conducted and the results are shown in Table 1 with the dry thickness of each photoconducive layer.

TABLE 1

| Sample No. | Sensitizing Dye | Amide Comp'd | $V_0(V)$ | $E_{50}$ | $E_{80}$ | Film Thickness (μm) |
|---|---|---|---|---|---|---|
| 1* | A-(3) | used | 460 | 34 erg/cm² | 110 erg/cm² | 5.2 |
| 2* | " | none | 456 | 84 erg/cm² | 210 erg/cm² | 5.1 |
| 3 | B-(14) | used | 470 | 30 lux · sec | 80 lux · sec | 5.2 |
| 4 | " | none | 450 | 62 lux · sec | 165 lux · sec | 5.1 |
| 5 | C₁-(3) | used | 460 | 24 lux · sec | 69 lux · sec | 5.2 |
| 6 | " | none | 456 | 48 lux · sec | 150 lux · sec | 5.1 |
| 7 | C₂-(4) | used | 480 | 22 lux · sec | 60 lux · sec | 5.3 |
| 8 | " | none | 460 | 48 lux · sec | 110 lux · sec | 5.1 |
| 9 | D-(1) | used | 480 | 34 lux · sec | 110 lux · sec | 5.3 |
| 10 | " | none | 480 | 84 lux · sec | 210 lux · sec | 5.2 |
| 11 | E-(1) | used | 500 | 36 lux · sec | 120 lux · sec | 5.5 |
| 12 | " | none | 505 | 90 lux · sec | 240 lux · sec | 5.1 |

*The samples of Run Nos. 1 and 2 were exposed to a monochromatic light of 633 nm.

Then, the samples were charged in a dark place to a surface potential of +450 V and then exposed to light of 633 nm emitted from an He-Ne laser. The exposed printing plates were developed with a liquid developer which was prepared by dispersing 5 g of polymethyl methacrylate particles (particle size: 0.3 μm) in 1 l of Isoper H (produced by Esso Standard Co., Ltd.) and adding 0.01 g of soybean oil lecithin to the dispersion as a charge control agent to thereby form clear positive toner images. The toner images were fixed by heating at 100° C. for 30 seconds.

The resulting printing plates were immersed in an etching solution comprising 70 g of sodium metasilicate hydrate dissolved in 140 ml of glycerin, 550 ml of ethylene glycol, and 150 ml of ethanol for about 1 minute and washed with running water while lightly brushing whereby the photoconductive insulating layers on the nonimage areas where the toner had not adhered were completely removed.

The resulting printing plates were mounted on an offset printing machine ("Hamada Star 600 CD"), and printing was carried out in a conventional manner. As a result, 50,000 prints of very clear image free from stains on the non-image area were obtained.

EXAMPLE 2

Electrophotographic printing plates were produced in the same manner as in Example 1 using various sensitizing dyes and amide compounds shown in Table 2.

Each of the resulting samples was evaluated for the electrophotographic characteristics in the same manner as in Example 1. The results obtained are shown in Table 2. The dry thickness of each photoconductive layer is also shown in Table 2.

TABLE 2

| Sample No. | Sensi- tizing Dye | Amide Comp'd | $V_o(V)$ | $E_{50}$ | $E_{80}$ | Film Thickness (μm) |
|---|---|---|---|---|---|---|
| 13* | A-(1) | (A) | +515 | 47 erg/cm$^2$ | 140 erg/cm$^2$ | 5.1 |
| 14* | A-(2) | (H) | +530 | 48 erg/cm$^2$ | 130 erg/cm$^2$ | 5.3 |
| 15* | A-(7) | (J) | +480 | 50 erg/cm$^2$ | 160 erg/cm$^2$ | 5.0 |
| 16* | A-(10) | (L) | +490 | 46 erg/cm$^2$ | 175 erg/cm$^2$ | 5.1 |
| 17* | A-(23) | (Q) | +510 | 50 erg/cm$^2$ | 150 erg/cm$^2$ | 5.3 |
| 18 | B-(9) | (A) | +500 | 26 lux · sec | 75 lux · sec | 5.1 |
| 19 | B-(15) | (H) | +560 | 28 lux · sec | 81 lux · sec | 5.5 |
| 20 | B-(12) | (J) | +510 | 26 lux · sec | 79 lux · sec | 5.0 |
| 21 | B-(4) | (L) | +500 | 40 lux · sec | 110 lux · sec | 5.2 |
| 22 | B-(1) | (Q) | +490 | 36 lux · sec | 104 lux · sec | 5.0 |
| 23 | C$_1$-(1) | (A) | +520 | 26 lux · sec | 72 lux · sec | 5.1 |
| 24 | C$_1$-(2) | (H) | +500 | 28 lux · sec | 75 lux · sec | 5.2 |
| 25 | C$_1$-(7) | (J) | +510 | 35 lux · sec | 85 lux · sec | 5.3 |
| 26 | C$_1$-(9) | (L) | +490 | 33 lux · sec | 80 lux · sec | 5.0 |
| 27 | C$_1$-(13) | (Q) | +530 | 36 lux · sec | 84 lux · sec | 5.3 |
| 28 | C$_2$-(1) | (A) | +510 | 25 lux · sec | 65 lux · sec | 5.3 |
| 29 | C$_2$-(2) | (H) | +500 | 28 lux · sec | 70 lux · sec | 5.1 |
| 30 | C$_2$-(9) | (J) | +490 | 36 lux · sec | 90 lux · sec | 5.0 |
| 31 | C$_2$-(16) | (L) | +530 | 30 lux · sec | 100 lux · sec | 5.1 |
| 32 | C$_2$-(20) | (Q) | +510 | 35 lux · sec | 95 lux · sec | 5.2 |
| 33 | D-(4) | (A) | +515 | 48 lux · sec | 130 lux · sec | 5.0 |
| 34 | D-(2) | (H) | +520 | 48 lux · sec | 130 lux · sec | 5.3 |
| 35 | D-(7) | (J) | +480 | 46 lux · sec | 175 lux · sec | 5.0 |
| 36 | D-(10) | (L) | +510 | 50 lux · sec | 160 lux · sec | 5.3 |
| 37 | D-(18) | (Q) | +500 | 50 lux · sec | 150 lux · sec | 5.1 |
| 38 | E(1) | (A) | +520 | 48 lux · sec | 160 lux · sec | 5.1 |
| 39 | E-(2) | (H) | +540 | 50 lux · sec | 170 lux · sec | 5.3 |
| 40 | E-(5) | (J) | +490 | 52 lux · sec | 165 lux · sec | 5.1 |
| 41 | E-(6) | (L) | +480 | 49 lux · sec | 175 lux · sec | 5.0 |
| 42 | E-(19) | (Q) | +510 | 51 lux · sec | 165 lux · sec | 5.2 |

*The samples of Run Nos. 13 to 17 were exposed to a monochromatic light of 633 nm.

EXAMPLE 3

Electrophotographic printing plates were produced in the same manner as in Example 1, except for replacing the benzyl methacrylate-methacrylic acid copolymer with a methyl methacrylate-methacrylic acid copolymer (methacrylic acid content: 30 mol %).

Electrophotographic characteristics, $V_0$, $E_{50}$, and $E_{80}$ of each samples were measured and the results are shown in Table 3 with the dry thickness of each photoconductive layer.

TABLE 3

| Sample No. | Sensi- tizing Dye | Amide Comp'd | $V_o(V)$ | $E_{50}$ | $E_{80}$ | Film Thickness (μm) |
|---|---|---|---|---|---|---|
| 43* | A-(3) | Comp'd (p) | +500 | 40 erg/cm$^2$ | 106 erg/cm$^2$ | 5.3 |
| 44 | B-(14) | Comp'd (p) | +500 | 32 lux · sec | 82 lux · sec | 5.3 |
| 45 | C$_1$-(3) | Comp'd (p) | +500 | 26 lux · sec | 72 lux · sec | 5.3 |
| 46 | C$_2$-(4) | Comp'd (p) | +500 | 23 lux · sec | 63 lux · sec | 5.1 |
| 47 | D-(1) | Comp'd (p) | +510 | 40 lux · sec | 106 lux · sec | 5.0 |
| 48 | E-(1) | Comp'd | +500 | 43 lux · sec | 115 lux · sec | 4.9 |

TABLE 3-continued

| Sample No. | Sensitizing Dye | Amide Comp'd | Vo(V) | E50 | E80 | Film Thickness (μm) |
|---|---|---|---|---|---|---|
| | | (p) | | | | |

*The sample of Run No. 43 was exposed to a monochromatic light of 633 nm.

After exposure with an He-Ne laser in the same manner as in Example 1, the printing plates were subjected to magnetic brush development by the use of a toner for Xerox 3500 (produced by Fuji Xerox Co., Ltd.), and the toner images were fixed by heating at 80° C. for 30 seconds. Then, the photoconductive insulating layers on the non-image areas were removed with the same etching solution as used in Example 1 to obtain a printing plates. As a result of printing in a conventional manner, 50,000 prints having a clear image free from background stains could be obtained.

EXAMPLE 4

Electrophotographic printing plates were produced in the same manner as in Example 1, except for replacing 75 g of the benzyl methacrylate-methacrylic acid copolymer with 125 g of a vinyl acetate-crotonic acid-vinyl neododecanate copolymer ("RESYN 28-2930" produced by Kanebo NSC Co., Ltd.).

Electrophotographic characteristics, $V_0$, $E_{50}$, and $E_{80}$ of each samples were measured and the results are shown in Table 4 with the dry thickness of each photoconductive layer.

TABLE 4

| Sample No. | Sensitizing Dye | Amide Comp'd | Vo(V) | E50 | E80 | Film Thickness (μm) |
|---|---|---|---|---|---|---|
| 49* | A-(3) | Comp'd (p) | +520 | 45 erg/cm² | 120 erg/cm² | 5.4 |
| 50 | B-(14) | Comp'd (p) | +520 | 35 lux · sec | 88 lux · sec | 5.4 |
| 51 | C₁-(3) | Comp'd (p) | +520 | 28 lux · sec | 76 lux · sec | 5.0 |
| 52 | C₂-(4) | Comp'd (p) | +500 | 28 lux · sec | 80 lux · sec | 4.9 |
| 53 | D-(1) | Comp'd (p) | +520 | 45 lux · sec | 120 lux · sec | 5.2 |
| 54 | E-(1) | Comp'd (p) | +520 | 46 lux · sec | 128 lux · sec | 5.0 |

*The sample of Run No. 49 was exposed to a monochlomatic light of 633 nm.

The resulting printing plates were charged, exposed, developed, and fixed in the same manner as in Example 1 and then immersed in a developer having pH of about 13.3 for PS plates ("DP-4" produced by Fuji Photo Film Co., Ltd.) diluted with water at a dilution of 1:8 (by volume) per 30 seconds to remove the photoconductive insulating layers on the non-image areas.

On printing using the resulting printing plates, clear prints free from background stains were obtained.

EXAMPLE 5

Electrophotographic printing plates were produced in the same manner as in Example 1, except for replacing 75 g of the benzyl methacrylate-methacrylic acid copolymer with 125 g of a vinyl acetate-crotonic acid copolymer ("RESYN 28-1310" produced by Kanebo NSC Co., Ltd.).

Electrophotographic characteristics, $V_0$, $E_{50}$, and $E_{80}$ of each sample were measured and the results are shown in Table 5 with the dry thickness of each photoconductive layer.

TABLE 5

| Sample No. | Sensitizing Dye | Amide Comp'd | Vo(V) | E50 | E80 | Film Thickness (μm) |
|---|---|---|---|---|---|---|
| 55* | A-(3) | Comp'd (p) | +490 | 46 erg/cm² | 125 erg/cm² | 5.1 |
| 56 | B-(14) | Comp'd (p) | +480 | 34 lux · sec | 87 lux · sec | 5.2 |
| 57 | C₁-(3) | Comp'd (p) | +490 | 29 lux · sec | 78 lux · sec | 4.8 |
| 58 | C₂-(4) | Comp'd (p) | +530 | 27 lux · sec | 77 lux · sec | 5.4 |
| 59 | D-(1) | Comp'd (p) | +510 | 46 lux · sec | 125 lux · sec | 5.3 |
| 60 | E-(1) | Comp'd (p) | +522 | 50 lux · sec | 150 lux · sec | 5.3 |

*The sample of Run No. 55 was exposed to a monochlomatic light of 633 nm.

The resulting printing plates were electrophotographically processed in the same manner as in Example 4 to obtain a printing plate. On printing, clear prints free from background stains could be obtained.

EXAMPLE 6

Electrophotographic printing plates were produced in the same manner as in Example 1, except for replacing 25 g of the benzyl methacrylate-methacrylic acid copolymer with 35 g of a styrene-maleic anhydride copolymer (maleic anhydride content: 33 mol%).

Electrophotographic characteristics, $V_0$, $E_{50}$, and $E_{80}$ of each sample were measured and the results are shown in Table 6 with the dry thickness of each photoconductive layer.

TABLE 6

| Sample No. | Sensitizing Dye | Amide Comp'd | $V_0$(V) | $E_{50}$ | $E_{80}$ | Film Thickness ($\mu$m) |
|---|---|---|---|---|---|---|
| 61* | A-(3) | Comp'd (p) | +450 | 38 erg/cm$^2$ | 100 erg/cm$^2$ | 4.7 |
| 62 | B-(14) | Comp'd (p) | +500 | 38 lux·sec | 100 lux·sec | 5.1 |
| 63 | $C_1$-(3) | Comp'd (p) | +450 | 26 lux·sec | 72 lux·sec | 5.0 |
| 64 | $C_2$-(4) | Comp'd (p) | +490 | 25 lux·sec | 70 lux·sec | 5.0 |
| 65 | D-(1) | Comp'd (p) | +480 | 38 lux·sec | 100 lux·sec | 4.9 |
| 66 | E-(1) | Comp'd (p) | +480 | 45 lux·sec | 135 lux·sec | 4.9 |

*The sample of Run No. 61 was exposed to a monochlomatic light of 633 nm.

EXAMPLE 7

As a photoconductive compound fifteen parts of a benzidine compound of formula (i) or a pyrazoline compound of formula (ii):

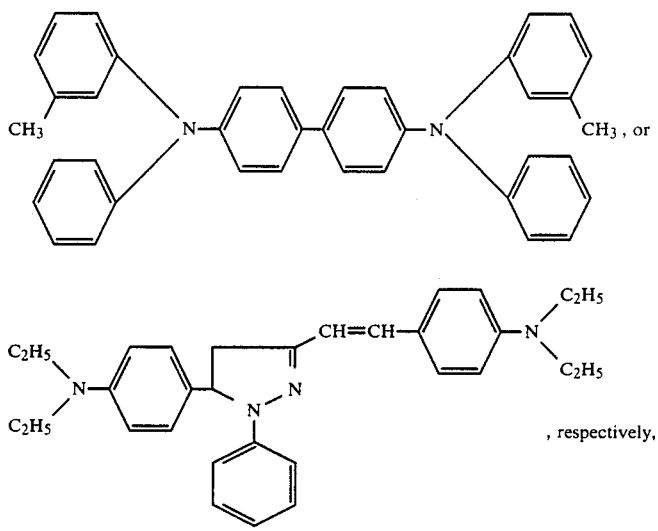

, respectively, 85 parts of a benzyl methacrylate-methacrylic acid copolymer (methacrylic acid content: 30 mol%), 1.18 parts of a sensitizing compound shown in Table 7, and 30 parts of amide compound (J) were dissolved in a mixed solvent of 510 parts of methylene chloride and 150 parts of methyl cellosolve acetate. The solution was coated on each of 0.25 mm thick grained aluminum sheets and dried to prepare electrophotographic printing plates.

Electrophotographic characteristics, $V_0$, $E_{50}$, and $E_{80}$ of each sample were measured and the results are shown in Table 7 with the dry thickness of each photoconductive layer.

TABLE 7

| Sample No. | Photoconductive Compound | Sensitizing Dye | $V_0$(V) | $E_{50}$ | $E_{80}$ | Film Thickness ($\mu$m) |
|---|---|---|---|---|---|---|
| 67* | (i) | A-(12) | +550 | 55 erg/cm$^2$ | 170 erg/cm$^2$ | 5.3 |
| 68 | (i) | B-(12) | +530 | 40 lux·sec | 90 lux·sec | 5.2 |
| 69 | (i) | $C_1$-(12) | +550 | 28 lux·sec | 73 lux·sec | 5.2 |
| 70 | (i) | $C_2$-(3) | +550 | 29 lux·sec | 72 lux·sec | 5.5 |
| 71 | (ii) | D-(4) | +530 | 55 lux·sec | 170 lux·sec | 5.3 |
| 72 | (i) | E-(10) | +500 | 53 lux·sec | 170 lux·sec | 5.0 |

*The sample of Run No. 67 was exposed to a monochlomatic light of 633 nm.

EXAMPLE 8

Fourty parts of an oxadiazole compound of formula:

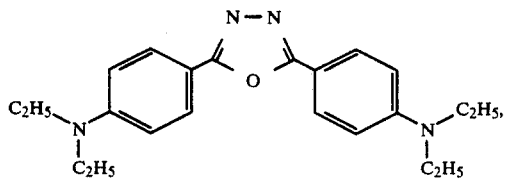

60 parts of a benzyl methacrylate-methacrylic acid copolymer (methacrylic acid content: 30 mol%), 1.18 parts of A-(3), and 30 parts of amide compound (K) were dissolved in a mixed solvent of 510 parts of methylene chloride and parts of methyl cellosolve acetate. The solution was coated on a 0.25 mm thick grained aluminum sheet and dried to prepare an electrophotographic printing plate having a photoconductive insulating layer of 5.2 μm in thickness. As a result of evaluations on electrophotographic characteristics, $V_0$, $E_{50}$, and $E_{80}$ were found to be +520 V, erg/cm2, and 210 erg/cm$^2$, respectively.

COMPARATIVE EXAMPLE 1

For comparison, a pigment-dispersed non-uniform electrophotographic printing plate was prepared.

In a mixed solvent of 8 parts of tetrahydrofuran and 2 parts of cyclohexanone were dissolved 2.5 parts of the same benzyl methacrylate-methacrylic acid copolymer (methacrylic acid content: 30 mol % as used in Example 1. To the resulting solution were added 0.25 part of ε-type copper phthalocyanine as an electric charge generating agent and then 40 g of glass beads having a particle size of 5 mm, and the mixture was transferred to a 50 cc-volume closed bottle and shaked in a paint shaker for 1 hour. To the resulting dispersion were added 8 parts of tetrahydrofuran and 2 parts of cyclohexanone, followed by filtration through a nylon filter of 200 mesh to remove coarse particles. In 5 parts of the filtrate was dissolved 0.11 part of the hydrazone compound used in Example 1 to prepare a coating composition.

The coating composition was coated on a 0.25 mm thick grained aluminum sheet and dried to prepare a non-uniform electrophotographic printing plate (Sample No. 73) having a photoconductive insulating layer of 4.1 pm in thickness.

The resulting printing plate was statically charged to +7.5 V by corona discharge by means of an electrostatic copying paper testing machine ("SP-428", manufactured by Kawaguchi Denki Co., Ltd.) and then exposed to a monochromatic light of 633 nm. As a result of evaluations on electrophotographic characteristics, $V_0$, $E_{50}$, and $E_{80}$ were found to be +326 V, 20 erg/cm$^2$, and 150 erg/cm$^2$, respectively.

Next, the sample was charged in a dark place to have a surface potential of +300 V and exposed to light of 633 nm emitted from an He-Ne laser. The exposed sample was developed with the same liquid developer as used in Example 1 to form a positive toner image. The toner image was fixed by heating at 100° C for 30 seconds. The printing plate was immersed in the same etching solution as used in Example 1 for about 1 minute and washed with running water while lightly brushing to remove the photoconductive insulating layer on the non-image area. It was observed that the pigment for electric charge generation remained unremoved on the grained surface of the aluminum sheet.

The resulting printing plate was mounted on an offset printing machine "Hamada Star 600CD", and printing was carried out in a conventional manner. The prints thus obtained were of poor sharpness suffering from background stains on the non-image area due to the remaining pigment.

For a better understanding of the electrophotographic sensitivity and stain resistance of the electrophotographic printing plate precursor of the present invention, the results of Example 1 (Sample Nos. 1 and 2) and Comparative Example 1 (Sample No. 73) are summarized in Table 8 below.

TABLE 8

| Sample No. | E50 | E80 | Background Stains | Note |
|---|---|---|---|---|
| 1 | 34 erg/cm$^2$ | 110 erg/cm$^2$ | not observed | Invention |
| 2 | 84 erg/cm$^2$ | 210 erg/cm$^2$ | " | Comparison |
| 73 | 20 erg/cm$^2$ | 150 erg/cm$^2$ | observed | Comparison |

As is seen from the data in Table 8 above, the electrophotographic printing plate (Sample No. 1) in accordance with the present invention exhibits sufficiently high sensitivity to respond to an He-Ne laser light source and provides a printing plate free from background stains on the non-image area due to its excellent behavior on etching. The printing plate of the present invention can be produced with satisfactory stability. In addition, the printing plate was proved satisfactorily preservable, withstanding use even on standing at 50° C for 10 weeks.

While the invention has been described in detail and with reference to specific embodiments thereof, it will be apparent to one skilled in the art that various changes and modifications can be made therein without departing from the spirit and scope thereof.

What is claimed is:

1. An electrophotographic printing plate produced by the removal of the non-image area on a photoconductive insulating layer by etching comprising a conductive support having a hydrophilic surface and provided thereon a photoconductive insulating layer containing:

(1) at least one organic photoconductive compound,
   (2) at least one sensitizer selected from the group consisting of compounds represented by formula (A-I), (A-II), (B), (C-1), (C-II), (C-III), (C-IV), (D) or (E);

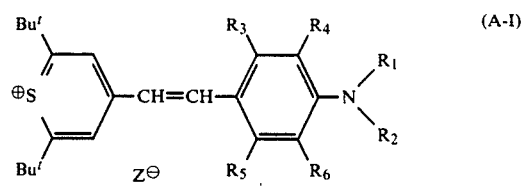

-continued

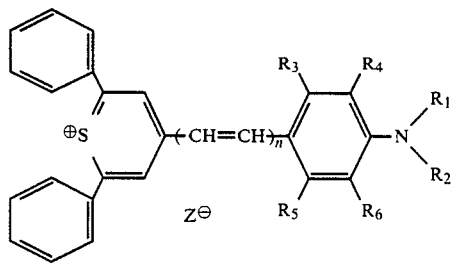 (A-II)

wherein Bu$^t$ represents a t-butyl group; R$_1$ and R$_2$, which may be the same or different, each represents a hydrogen atom, a substituted or unsubstituted alkyl group having from 1 to 5 carbon atoms, or a substituted or unsubstituted aryl group having from 6 to 18 carbon atoms; R$_3$, R$_4$, R$_5$, and R$_6$, which may be the same or different, each represents a hydrogen atom, an alkyl group having from 1 to 5 carbon atoms, an alkoxy group having from 1 to 5 carbon atoms, or a halogen atom; Z$\ominus$ represents an anion; and n represents 0 or 1;

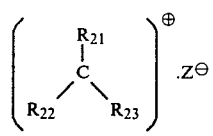 (B)

wherein R$_{21}$ represents a hydrogen atom or a substituted or unsubstituted aryl group which may be condensed with a substituted or unsubstituted heterocyclic ring; R$_{22}$ and R$_{23}$, each represents a substituted or unsubstituted aryl group which may be condensed with a substituted or unsubstituted heterocyclic ring; and Z$\ominus$ represents an anion;

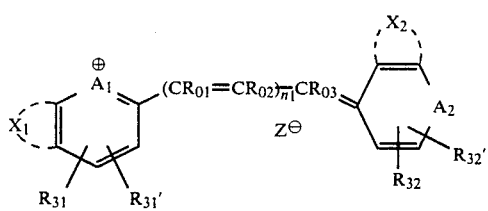 (C-I)

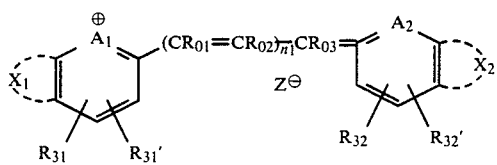 (C-II)

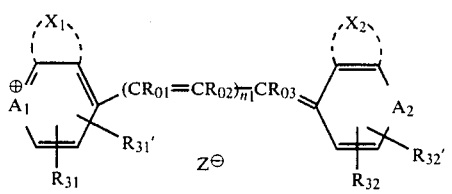 (C-III)

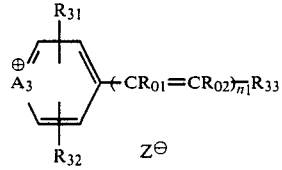 (C-IV)

wherein A$_1$ and A$_2$, which may be the same or different, each represents —O—, —S— or —Se—; A$_3$ represents —Se— or O; R$_{31}$, R$_{31}''$, R$_{32}$ and R$_{32}'$, which may be the same or different, each represents a hydrogen atom, a substituted or unsubstituted alkyl group, a substituted or unsubstituted alkenyl group, a substituted or unsubstituted aralkyl group, or a substituted or unsubstituted aryl group; R$_{33}$ represents a substituted or unsubstituted aryl group; X$_1$ and X$_2$ each represents nothing or a ring selected from the group consisting of a benzene ring, a naphthalene ring, an anthracene ring, and a phenanthrene ring which is condensed to the pyran, thiopyran or selenapyran ring; R$_{01}$, R$_{02}$, and R$_{03}$, which may be the same or different, each represents a hydrogen atom or a substituted or unsubstituted alkyl group; n$_1$ represents 0, 1 or 2, provided that when both of A$_1$ and A$_2$ represent —O— and when one of them represents —O—, and the other one represents —S—, n$_1$ represents 0 or 1; and Z$\oplus$ represents an anion;

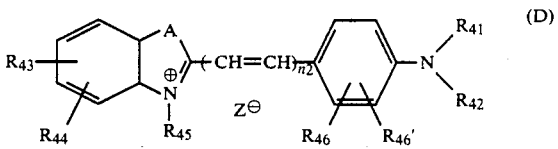 (D)

wherein A represents —O—, —S—, —Se—,

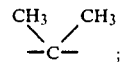

—CH=CH—, or

R$_{41}$ and R$_{42}$, which may be the same or different, each represents a hydrogen atom, a substituted or unsubstituted alkyl group, a substituted or unsubstituted alkenyl group, a substituted or unsubstituted aralkyl group, or a substituted or unsubstituted aryl group; R$_{45}$ and R$_{47}$, which may be the same or different, each represents a substituted or unsubstituted alkyl group, a substituted or unsubstituted alkenyl group, a substituted or unsubstituted aralkyl group, or a substituted or unsubstituted aryl group; R$_{43}$, R$_{44}$, R$_{46}$, and R$_{46}'$ which may be the same or different, each represents a hydrogen atom, a halogen atom, a nitro group, an amido group, an acyl group, a cyano group, a trifluoromethyl group, a substituted or unsubstituted alkyl group, a substituted or unsubstituted alkenyl group, a substituted or unsubstituted aralkyl group, a substituted or unsubstituted aryl group, a substituted or unsubstituted alkoxy group, a substituted or unsubstituted alkenyl group, or a substituted or unsubstituted alkoxycarbonyl group; or $R_{43}$ and $R_{44}$ are taken together to form a ring, or $R_{46}$ and $R_{46}'$ are taken together to form a ring; $n_2$ represents 1 or 2, and $Z\ominus$ represents an anion;

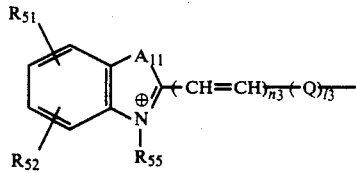

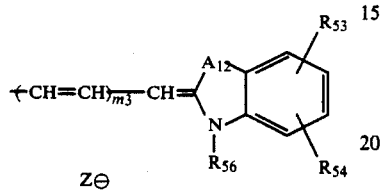

wherein $A_{11}$ and $A_{12}$, which may be the same or different, each represents —O—, —S—, —Se—,

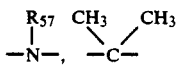

or —CH=CH=; $R_{51}$, $R_{52}$, $R_{53}$, and $R_{54}$, which may be the same or different, each represents a hydrogen atom, a halogen atom, a nitro group, an amido group, an acyl group, a cyano group, a trifluoromethyl group, a substituted or unsubstituted alkyl group, a substituted or unsubstituted alkenyl group, a substituted or unsubstituted aralkyl group, a substituted or unsubstituted aryl group, a substituted or unsubstituted alkoxy group, a substituted or unsubstituted aryloxy group, or a substituted or unsubstituted alkoxycarbonyl group; or $R_{51}$ and $R_{52}$ are taken together to form a ring, or $R_{53}$ and $R_{54}$ are taken together to form a ring; $R_{55}$, $R_{56}$, and $R_{57}$, which may be the same or different, each represents a substituted or unsubstituted alkyl group, a substituted or unsubstituted alkenyl group, substituted or unsubstituted aralkyl group, or a substituted or unsubstituted aryl group; Q represents a substituted or unsubstituted divalent aromatic hydrocarbon group or a substituted or unsubstituted divalent aromatic heterocyclic group; $l_3$ represents 0 or 1; $m_3$ and $n_3$ each represents 0 or 1; and $Z\ominus$ represents an anion;

(3) at least one amide compound selected from the group consisting of compounds represented by formula (I), (II), or (III);

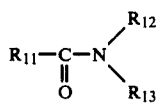

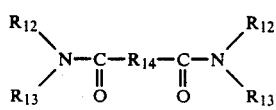

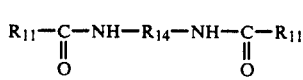

wherein $R_{11}$ represents a substituted or unsubstituted alkyl group, a substituted or unsubstituted alkoxy group, a substituted or unsubstituted monocyclic or condensed bicyclic aryl group, a substituted or unsubstituted monocyclic or condensed bicyclic aryloxy group, or a monovalent group derived from a substituted or unsubstituted heterocyclic ring, two $R_{11}$ groups may be the same or different; and $R_{12}$ and $R_{13}$, which may be the same or different, each represents a hydrogen atom, a substituted or unsubstituted alkyl group, a substituted or unsubstituted monocyclic or condensed bicyclic aryl group, or a monovalent group derived from a substituted or unsubstituted heterocyclic ring; $R_{11}$ and $R_{12}$, or $R_{12}$ and $R_{13}$ may be connected to each other to form a divalent group; and $R_{14}$ represents a melhylene group, a polymethylene group, a branched alkanediyl group, or an arylene group; and (4) a binder resin soluble or dispersible in an alkaline solvent.

2. An electrophotographic printing plate as claimed in claim 1, wherein said organic photoconductive compound is present in an amount of from 0.05 to 3 parts by weight per part by weight of the binder resin.

3. An electrophotographic printing plate as claimed in claim 1, wherein said at least one sensitizer is present in an amount of from 0.0001 to 30 parts by weight per 100 parts by weight of the organic photoconductive compound.

4. An electrophotographic printing plate as claimed in claim 1, wherein said at least one amide compound is present in an amount of from 0.01 to 50 parts by weight per 100 parts by weight of the organic photoconductive compound.

5. An electrophotographic printing plate as claimed in claim 1, wherein the thickness of the photoconductive insulating layer is from 1 to 10 μm.

6. An electrophotographic printing plate as claimed in claim 1, wherein the substituent of the alkyl group represented by $R_1$ and $R_2$ in formula (A-I) or (A-II) is a substituent selected from the group consisting of a cyano group, a halogen atom, a hydroxyl group, a carboxyl group, an alkoxy group containing a straight chain or branched alkyl group having from 1 to 5 carbon atoms, an aryl group having from 6 to 18 carbon atoms, an aryloxy group having from 6 to 18 carbon atoms, an alkoxycarbonyl group having from 1 to 5 carbon atoms in the alkyl moiety thereof, and an acyloxy group containing an alkylcarbonyl group having from 1 to 5 carbon atoms or a substituted or unsubstituted arylcarbonyl group having from 7 to 18 carbon atoms as the acyl moiety thereof.

7. An electrophotographic printing plate as claimed in claim 1, wherein the substituent for the aryl group represented by $R_1$ and $R_2$ in formula (A-I) or (A-II) is a group selected from the group consisting of a straight chain or branched alkyl group having from 1 to 5 carbon atoms, an alkoxy group containing a straight chain or branched alkyl group having from 1 to 5 carbon atoms, an alkoxycarbonyl group containing a straight chain or branched alkyl group having from 1 to 5 carbon atoms, a carboxyl group, a halogen atom, a mono- or di-alkyl ($C_1 \sim 5$) substituted or unsubstituted amino group, a nitro group, and a cyano group.

8. An electrophotographic printing plate as claimed in claim 1, wherein the substituent for the aryl group represented by $R_{2l}$, $R_{22}$ and $R_{23}$ in formula (B) is a substituent selected from the group consisting of a cyano group, a hydroxyl group, a carboxyl group, a nitro group, a halogen atom, an amino group, an alkoxy group, an aryl group, an aryloxy group, an alkoxycarbonyl group, an acyloxy group, an amino group substituted with at least one of alkyl, aryl or aralkyl group, and a trifluoromethyl group.

9. An electrophotographic printing plate as claimed in claim 1, wherein the heterocyclic ring included in the group represented by $R_{21}$, $R_{22}$ and $R_{23}$ in formula (B) is a 5- to 7-membered ring containing at least one of O, N and S atoms.

10. An electrophotographic printing plate as claimed in claim 9, wherein the heterocyclic ring is a ring selected from the group consisting of a substituted or unsubstituted pyrrole ring, a substituted or unsubstituted indole ring, a substituted or unsubstituted furan ring, a substituted or unsubstituted benzofuran ring, a substituted or unsubstituted thiophene ring, a substituted or unsubstituted pyridine ring, a substituted or unsubstituted quinoline ring, a substituted or unsubstituted imidazole ring, and a substituted or unsubstituted thiazole ring.

11. An electrophotographic printing plate as claimed in claim 9, wherein the heterocyclic ring is substituted with at least one substituent selected from the group consisting of a cyano group, a hydroxyl group, a carboxyl group, a nitro group, a halogen atom, an amino group, an alkoxy group, an aryl group, an aryloxy group, an alkoxycarbonyl group, an acyloxy group, an amino group substituted with at least one of alkyl, aryl or aralkyl group, and a trifluoromethyl group.

12. An electrophotographic printing plate as claimed in claim 1, wherein the substituent of the substituted group represented by $R_{31}$, $R_{31}'$, $R_{32}$, $R_{32}'$, $R_{33}$, $R_{01}$, $R_{02}$, $R_{03}$, $X_1$ or $X_2$ in formulae (C-I) to (C-IV) is a substituent selected from the group consisting of a cyano group, a hydroxyl group, a carboxyl group, a nitro group, a halogen atom, an amino group, an alkoxy group, an aryl group, an aryloxy group, an alkoxycarbonyl group, an acyloxy group, an amino group substituted with at least one of alkyl, aryl or aralkyl group, and a trifluoromethyl group.

13. An electrophotographic printing plate as claimed in claim 1, wherein the substituent of the substituted group represented by $R_{41}$, $R_{42}$, $R_{43}$, $R_{44}$, $R_{45}$, $R_{46}$, $R_{46}'$ or $R_{47}$ in formula (D) in a substitutent selected from the group consisting of a cyano group, a hydroxyl group, an acyl group, a nitro group, a halogen atom, an amino group, an alkoxy group, an aryl group, an aryloxy group, an alkoxycarbonyl group, an acyloxy group, an amino group substituted with an alkyl, aryl or aralkyl group, and a trifluoromethyl groups.

14. An electrophotographic printing plate as claimed in claim 1, wherein the substituent of the substituted groups represented by $R_{51}$ to $R_{57}$ or Q in formula (E) is a substituent selected from the group consisting of a cyano group, a hydroxyl group, a carboxyl group, a nitro group, a halogen atom, an amino group, an alkoxy group, an aryl group, an aryloxy group, an alkoxycarbonyl group, an acyloxy group, an amino group substituted with at least one of alkyl, aryl or aralkyl group, and a trifluoromethyl group.

15. An electrophotographic printing plate as claimed in claim 1, wherein Q in formula (E) represents a group or a ring selected from the group consisting of a phenylene group, naphthylene group, an anthrylene group, a furan ring, a pyrrole ring, a thiophene ring, a benzofuran ring, an indole ring, a thiazole ring, and an amidazole ring.

16. An electrophotographic printing plate as claimed in claim 1, wherein $Z^\ominus$ in formulae (A-I), (A-II), (B), (C-I) to (C-IV), (D) and (E) is an anion of an acid represented by HZ and having a pKa of not more than 5.

17. An electrophotographic printing plate as claimed in claim 1, wherein $Z^\ominus$ in formulae (A-I), (A-II), (B), (C-I) to (C-IV), (D) and (E) is an anion selected from the group consisting of halogen anions, trifluoroacetate, trichloroacetate, and p-toluenesulfonate ions, perchlorate, periodate, tetrachloroaluminate, trichloroferrate (II), tetrafluoroborate, hexafluorophosphate, hydrogensulfate, and nitrate ions.

18. An electrophotographic printing plate as claimed in claim 1, wherein the substituent of the alkyl group and the alkoxy group represented by $R_{11}$, $R_{12}$ or $R_{13}$ in formulae (I) to (III) is a substituent selected from the group consisting of a halogen atom, a cyano group, a nitro group, a phenyl group, and a tolyl group.

19. An electrophotographic printing plate as claimed in claim 1, wherein the monocyclic and bicyclic aryl group represented by $R_{11}$, $R_{12}$ or $R_{13}$ in formulae (I) to (III) is a group selected from the group consisting of a phenyl group and a naphthyl group.

20. An electrophotographic printing plate as claimed in claim 1, wherein the substituent of the monocyclic and bicyclic aryl and aryloxy groups represented by $R_{11}$, $R_{12}$ or $R_{13}$ in formulae (I) to (III) is a substituent selected from the group consisting of a halogen atom, a cyano group, a nitro group, and a straight chain or branched alkyl group having from 1 to 5 carbon atoms, a substituted straight chain or branched alkyl group having from 1 to 22 carbon atoms, a straight chain or branched alkoxy group having from 1 to 5 carbon atoms, an alkoxycarbonyl group having a straight chain or branched alkyl group having from 1 to 5 carbon atoms, and an acyl group having a straight chain or branched alkyl group having from 1 to 5 carbon atoms.

21. An electrophotographic printing plate as claimed in claim 1, wherein the monocyclic and bicyclic condensed heterocyclic group represented by $R_{11}$, $R_{12}$ or $R_{13}$ in formulae (I) to (III) is a group selected from the group consisting of pyrrolidinyl, piperidinyl, piperidino, morpholinyl, morpholino, pyrrolyl, imidazolyl, pyridyl, pyrimidinyl, indolinyl, isoindolinyl, indolyl, isoindolyl, benzimidazolyl, quinolyl, and isoquinolyl groups.

22. An electrophotographic printing plate as claimed in claim 1, wherein the substituent of the monocyclic cyclic and bicyclic aryl and aryloxy groups represented by $R_{11}$, $R_{12}$ or $R_{13}$ in formulae (I) to (III) is a substituent selected from the group consisting of a halogen atom, a cyano group, a nitro group, a phenyl group, a tolyl group, a benzyl group, a phenethyl group, and a straight chain or branched alkyl group having from 1 to 5 carbon atoms.

23. An electrophotographic printing plate as claimed in claim 1, wherein $R_{11}$ and $R_{12}$, or $R_{12}$ and $R_{13}$ in formula (I), and $R_{12}$ and $R_{13}$ in formula (II) are connected to each other to form a divalent group selected from the group consisting of a trimethylene group, a tetramethylene group, a pentamethylene group, an oxydiethylene group, and these divalent groups wherein 1 to 3 hydrogen atoms are substituted with a substituent selected from the group consisting of a halogen atom, a cyano group, a nitro group, a phenyl group, a tolyl group, a benzyl group, a phenethyl group, and a straight chain or branched alkyl group having from 1 to 5 carbon atoms.

24. An electrophotographic printing plate as claimed in claim 1, wherein the arylene group represented by $R_{14}$ in formula (II) or (III) is a group selected from the group consisting of a o-, m-, and p-phenylene groups and a naphthylene group.

25. An electrophotographic printing plate as claimed in claim 1, wherein the alkaline solvent contains at least one alkaline compound selected from the group consisting of sodium hydroxide, potassium hydroxide, sodium carbonate, sodium silicate, sodium metasilicate, sodium phosphate, ammonia, and amino-alcohols.

26. An electrophotographic printing plate as claimed in claim 1, wherein the alkaline solvent is an alkaline aqueous solution having pH of at least 7.

27. An electrophotographic printing plate as claimed in claim 1, wherein the binder resin is a copolymer of monomers selected from the group consisting of an acrylic ester, a methacrylic ester, styrene, vinyl acetate, a monomer containing a carboxyl group or an acid anhydride group, methacrylamide, vinylpyrrolidone, and a monomer having a phenolic hydroxyl group, a sulfo group, a sulfonamido group or a sulfonimido group.

28. An electrophotographic printing plate as claimed in claim 1, wherein the binder resin is a resin selected from the group consisting of a styrene-maleic anhydride copolymer, a styrene-maleic anhydride monoalkyl ester copolymer, a methacrylic acid-methacrylic ester copolymer, a styrene-methacrylic acid-methacrylic ester copolymer, an acrylic acid-methacrylic ester copolymer, a styrene-acrylic acid-methacrylic acid copolymer, a vinyl acetate-crotonic acid copolymer, a vinyl acetate-crotonic acid-methacrylic ester copolymer, phenolic resins, partially saponified vinyl acetate resins, xylene resins, and vinyl acetal resins.

29. An electrophotographic printing plate as claimed in claim 1, wherein the photoconductive insulating layer contains at least one organic photoconductive compound selected from the group consisting of triazole derivatives, oxadiazole derivatives, imidazole derivatives, polyarylalkane derivatives, pyrazoline derivatives, phenylenediamine derivatives, arylamine derivatives, amino-substituted chalcone derivatives, N,N-bicarbazyl derivatives, oxazole derivatives, styrylanthracene derivatives, fluorenone derivatives, hydrazone derivatives, and benzidine derivatives.

* * * * *